(12) United States Patent
Kainulainen et al.

(10) Patent No.: US 12,464,397 B2
(45) Date of Patent: Nov. 4, 2025

(54) METHODS, APPARATUS AND SYSTEMS FOR MULTIPLEXING SENSING AND MEASUREMENT DATA BETWEEN CONTROL PLANE AND USER PLANE

(71) Applicant: InterDigital Patent Holdings, Inc., Wilmington, DE (US)

(72) Inventors: Jani-Pekka Kainulainen, London (GB); Alain Mourad, Staines-Upon-Thames (GB); James Miller, Northport, NY (US)

(73) Assignee: InterDigital Patent Holdings, Inc.

( * ) Notice: Subject to any disclaimer, the term of this patent is extended or adjusted under 35 U.S.C. 154(b) by 396 days.

(21) Appl. No.: 18/012,276

(22) PCT Filed: Jun. 24, 2021

(86) PCT No.: PCT/US2021/038844
§ 371 (c)(1),
(2) Date: Dec. 22, 2022

(87) PCT Pub. No.: WO2021/262946
PCT Pub. Date: Dec. 30, 2021

(65) Prior Publication Data
US 2023/0239715 A1 Jul. 27, 2023

Related U.S. Application Data

(60) Provisional application No. 63/044,105, filed on Jun. 25, 2020.

(51) Int. Cl.
*H04W 24/10* (2009.01)
(52) U.S. Cl.
CPC .................................. *H04W 24/10* (2013.01)

(58) Field of Classification Search
CPC ...................................................... H04W 24/10
(Continued)

(56) References Cited

U.S. PATENT DOCUMENTS

2018/0302914 A1* 10/2018 da Silva ................ H04W 76/27
2019/0037450 A1* 1/2019 Chang ................... H04W 36/18
(Continued)

FOREIGN PATENT DOCUMENTS

EP 2360960 A2 8/2011
WO WO 2013066679 A1 5/2013
(Continued)

OTHER PUBLICATIONS

"New SID on AI and its applications in NR", 3GPP Tdoc RP-191077, 3GPP TSG-RAN#84, Newport Beach, California, USA, Jun. 3-6, 2019, 4 pages.
(Continued)

*Primary Examiner* — Faisal Choudhury
(74) *Attorney, Agent, or Firm* — Jamie T. Nguyen

(57) ABSTRACT

Procedures, methods, architectures, apparatuses, systems, devices, and computer program products may be used to communicate with a wireless network. A wireless transmit/receive unit (WTRU) may be configured to multiplex the transmission of measurement data, as control plane data, between the WTRU and a network entity via a first wireless path and the transmission of measurement data, as user plane data, between the WTRU and the network entity via a second wireless path. Switching to/from the second wireless path may be based on a state of the first wireless path, a state of the network, a state of the WTRU and/or an amount of measurement data to be communicated by the WTRU or which has been communicated by the WTRU.

18 Claims, 18 Drawing Sheets

(58) Field of Classification Search
USPC .......................................................... 370/252
See application file for complete search history.

(56) References Cited

U.S. PATENT DOCUMENTS

2019/0215726 A1* 7/2019 Park .................... H04W 16/18
2022/0007249 A1* 1/2022 You .................... H04W 76/30

FOREIGN PATENT DOCUMENTS

WO    WO 2020067812 A1    4/2020
WO    WO 2021262946 A1    12/2021

OTHER PUBLICATIONS

"O-RAN Use Cases and Deployment Scenarios", O-RAN Alliance White Paper, Feb. 2020, 21 pages.
Ericsson, "User Plane Solution for QoE Measurements", 3GPP Tdoc R2-1704734, 3GPP TSG RAN WG2 #98, Hangzhou, China, May 15-19, 2017, 2 pages.
CATT, "New SRB for MDT Reporting", 3GPP Tdoc R2-102792, 3GPP TSG RAN WG2 Meeting #70, Montreal, Canada, May 10-14, 2010, 2 pages.

* cited by examiner

METHODS, APPARATUS AND SYSTEMS FOR MULTIPLEXING SENSING AND MEASUREMENT DATA BETWEEN CONTROL PLANE AND USER PLANE

CROSS-REFERENCE TO RELATED APPLICATIONS

This application is a U.S. National Stage Application under 35 U.S.C. § 371 of International Patent Application No. PCT/US2021/038844, filed 26 Jun. 2021, which claims the benefit of U.S. Provisional Patent Application No. 63/044,105 filed 25 Jun.2020, which is incorporated herein by reference.

BACKGROUND

The present disclosure is generally directed to the fields of communications, software and encoding, including, for example, to methods, architectures, apparatuses, systems directed to wireless communications and, more particularly to communications using radio bearers.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communication System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Certain embodiments may be implemented in autonomous and/or semi-autonomous vehicles, robotic vehicles, cars, IoT gear, any device that moves, or a WTRU or other communication devices, which, in turn, may be used in a communication network. The following section provides a description of some exemplary WTRUs and/or other communication devices and networks in which they may be incorporated.

Figure 1A:
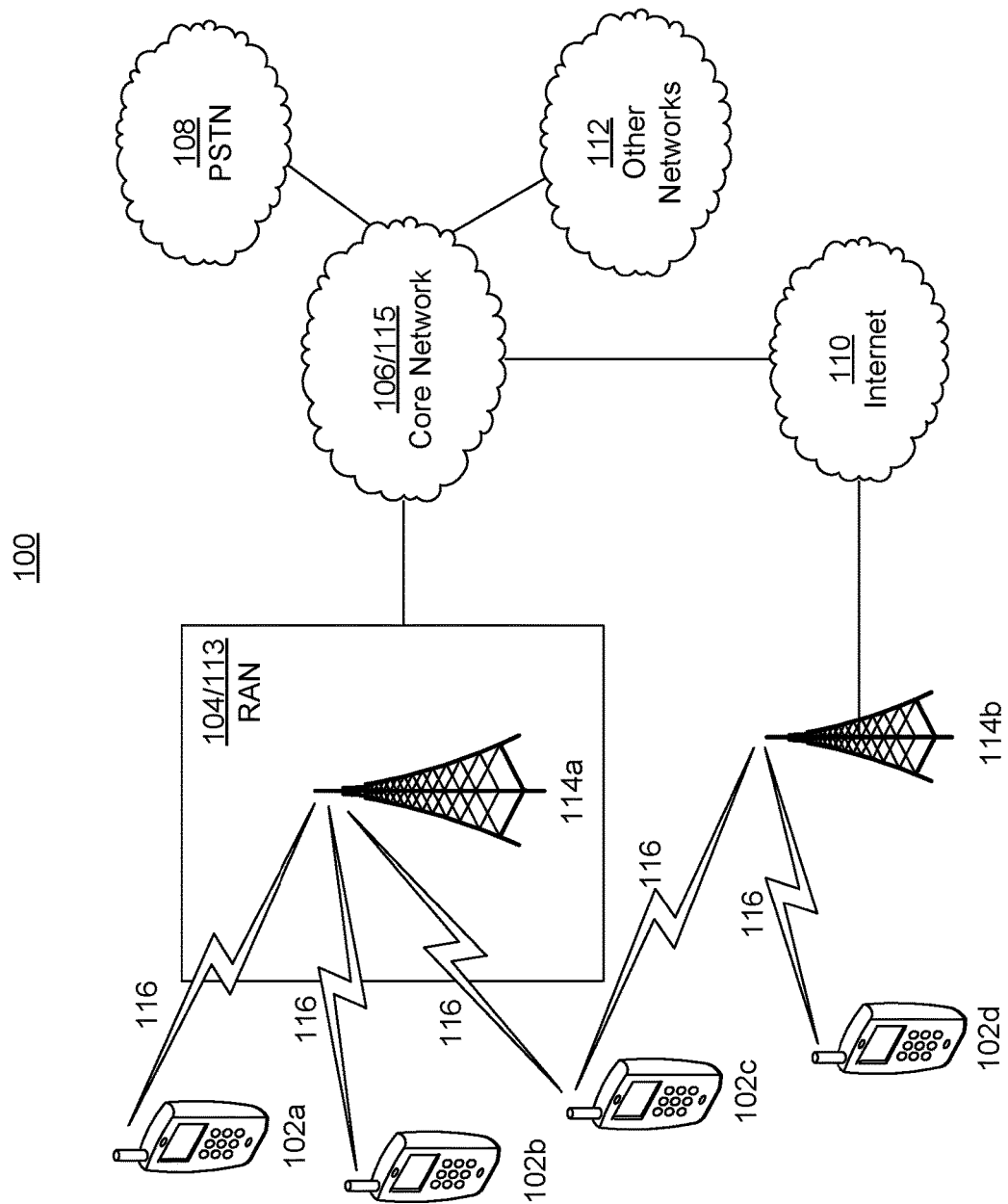
FIG. 1A is a system diagram illustrating an example communications system in which one or more disclosed embodiments may be implemented.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
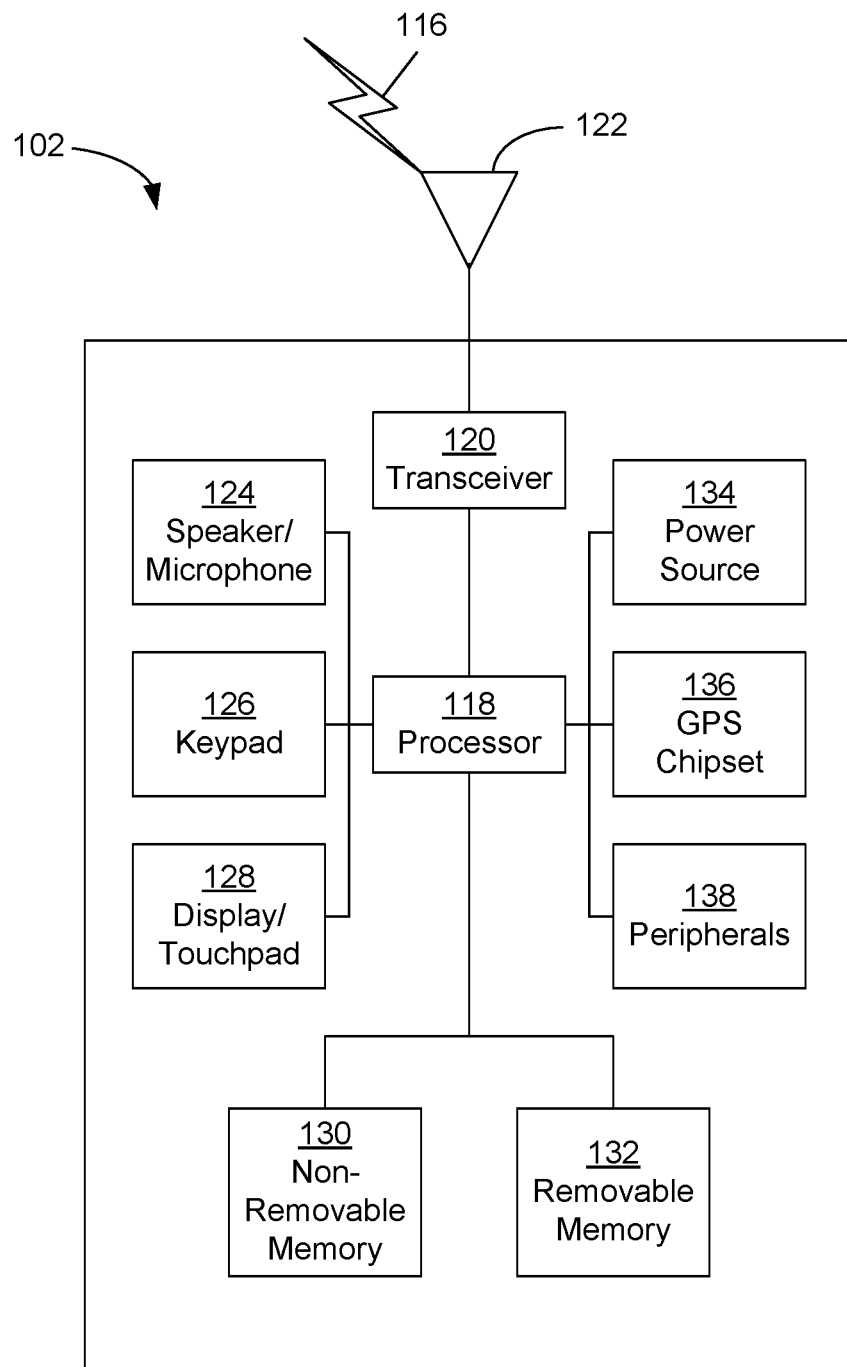
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
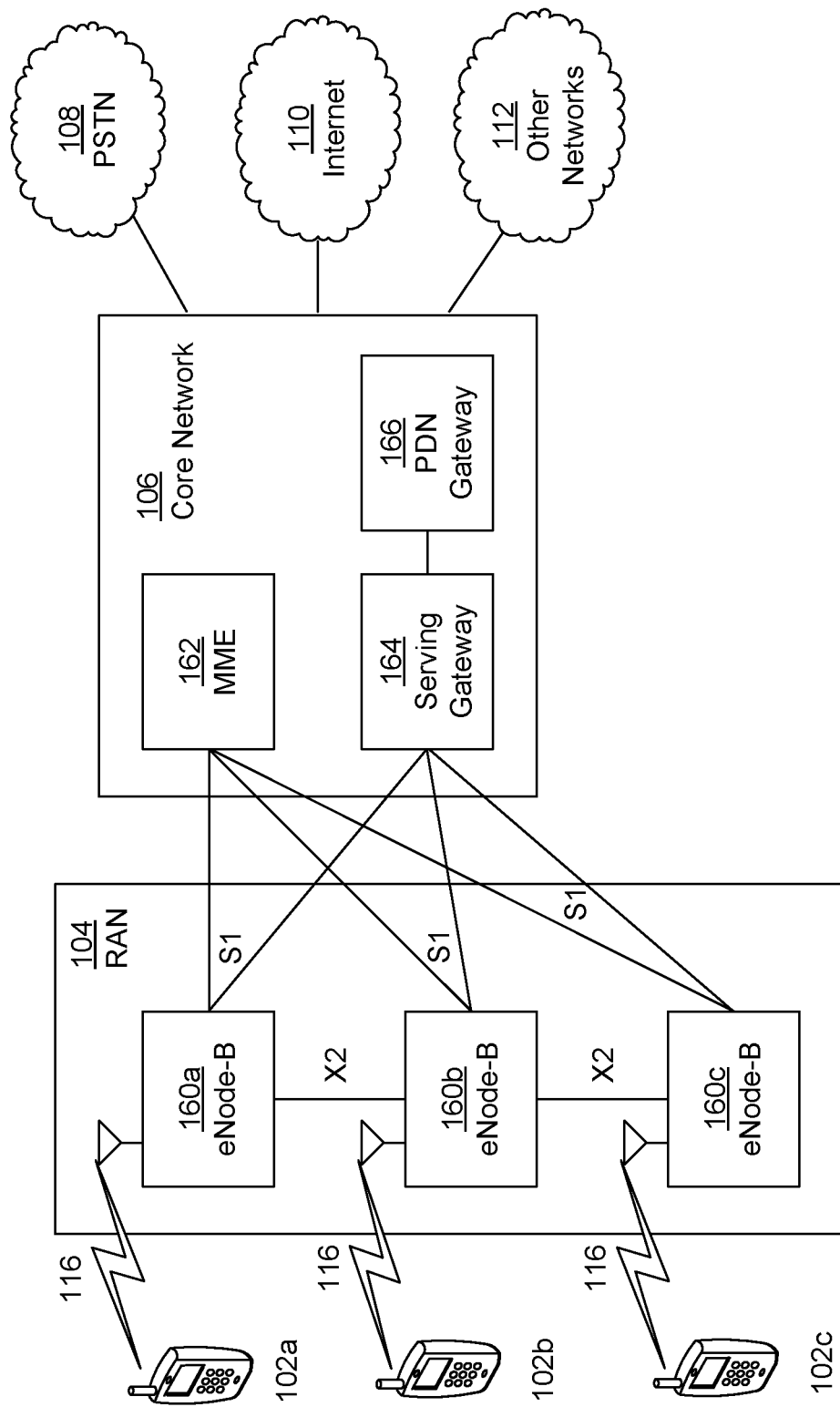
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
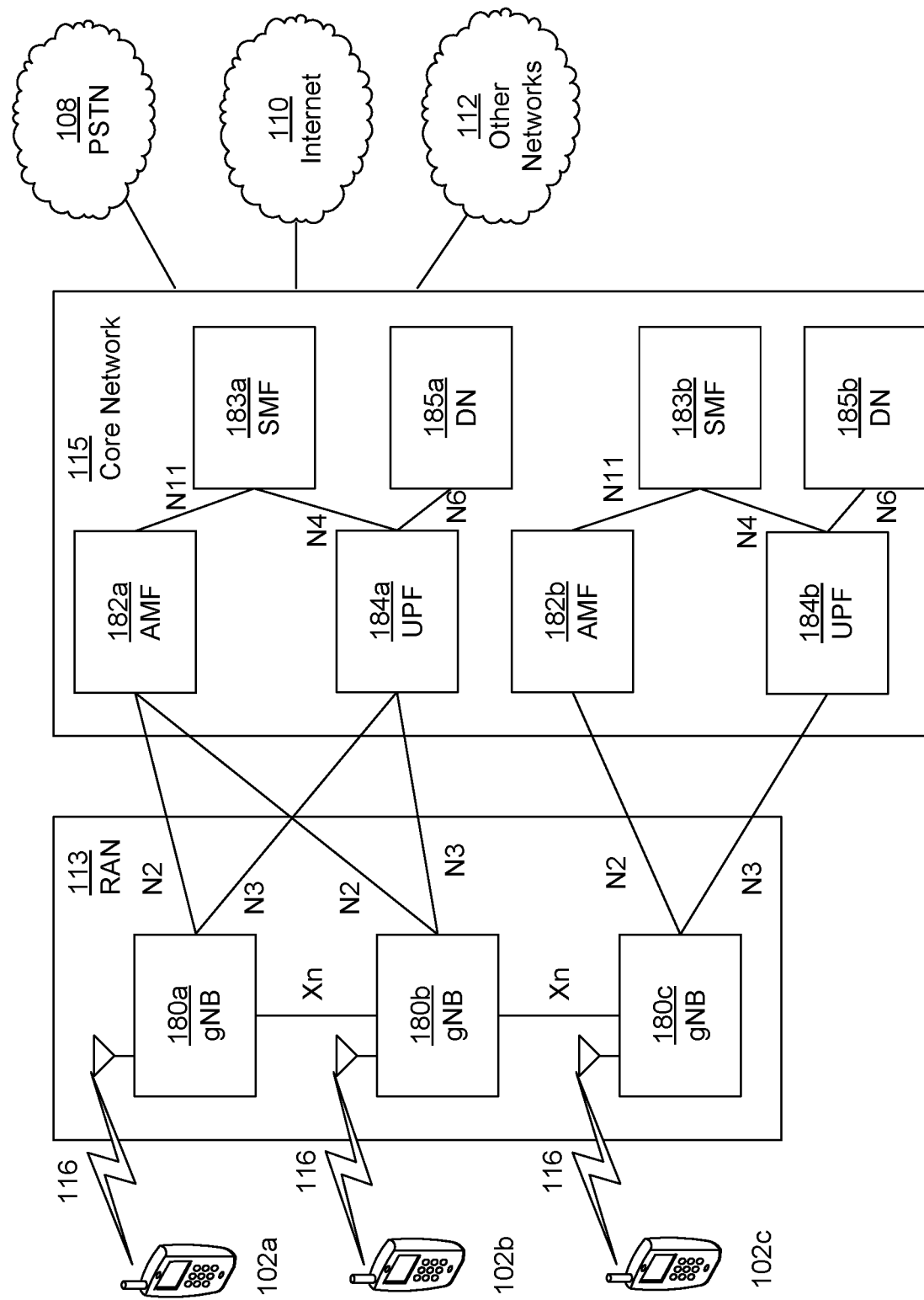
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Overview

Applying Artificial intelligence (AI) or machine learning (ML) algorithms into wireless communications has been gaining momentum. For example, AI or ML applications in End-to-End (E2E) 5G and beyond systems may lead to performance improvements in one or more of MIMO, channel coding, channel estimation, waveform design, power control, beam management, mobility enhancement, energy saving, Self-Organizing Network (SON) and/or Minimization of Drive Test (MDT), among others. To apply AI and ML, it may be desirable to implement improved measurement and reporting mechanisms/procedures in the network and from the WTRU 102 and at one, some or all layers (e.g. the PHY layer, the RRM layer and/or other protocol stack layers, etc.). In certain representative embodiments, apparatus, systems and/or procedures may be implemented for coordination between or among one or more network entities (e.g., a gNB) and one or more WTRUs 102 on AI training and/or execution and signaling to support execution of AI algorithms, considering at least L1 and/or L2/L3 signaling.

Open interfaces and services may be defined for a 3GPP-based distributed RAN architecture and, in certain embodiments, may improve support for real-time RAN analytics and/or non-real time RAN analytics.

The data collection framework in RAN may be based on MDT. MDT can be implemented, for example, to minimize drive tests for network operators and is based upon one or more WTRUs 102 sending RRC protocol and/or MDT framework specific measurements to the RAN. For MDT, control plane transport mechanisms/procedures are used for communication of the RRC protocol and/or MDT framework specific measurement data to the RAN.

In the MDT framework, WTRU-collected measurements are used for a Self-Organization and Self Optimization Network (SON) functions by the RAN, and for example may enable improved RAN and/or 5G core configurations and/or runtime optimizations. The control plane transport mechanisms/procedures of the MDT cover specific use cases, such as Coverage hole, Weak coverage, Pilot Pollution, Overshoot coverage, Coverage mapping, UL coverage, and Cell boundary mapping.

As the requisite training and inference data used by AI and/or ML applications, for example to facilitate optimizing network performance is constantly increasing, larger amounts (e.g., larger and larger amounts) of data may be communicated (e.g., may need to be communicated) which may be beyond the capacity of control plane transport mechanisms/procedure used in the MDT framework. In general, data used for RAN optimizations may be considered to originate from one or more WTRUs and/or from one or more RAN nodes. A framework may be based on the WTRU 102 transmitting the RRC protocol and/or MDT framework specific measurement data via a control plane transport mechanism/procedure. As the analytics capability of AI and ML evolves, it is contemplated that ever larger amounts of analytics data may be used/transmitted from the WTRUs 102. The existing MDT framework to carry RRC protocol and/or MDT framework specific measurements data from the WTRU 102 via the control plane to the RAN may be limited and the control plane transport mechanism/procedures for MDT do not scale to cope with the contemplated amounts of additional analytics data to be used for growing applications of AI and ML in the network.

5G RAN allows for a large number of deployment options for dual connectivity and/or disaggregation of Network Access Points (e.g., gNBs). For example, a gNB may be logically separated, for example, into a plurality of units/modules/hardware entities such as a Central Unit (CU) and/or a Distributed Unit (DU). The disaggregation may lead to increases in deployment complexity and/or may complicate optimization of such deployments. As networks evolve towards WTRU-centric or cell-less RAN deployments, it is contemplated that the complexity of the network will increase even further (e.g., increased complexity may further the requirements and/or need for communication of data for analytics and/or the use of such analytics in the network).

Manufacturers may introduce new capability device types (e.g., new 5G and beyond capable device types) into the network. These device types may vary and may include, for example industrial sensors (e.g., smart city enabled video cameras, Internet of Things (IOT) devices and/or sensor networks, among others). Factory Automation devices (FAs) are an example of massive machine type communication (mMTC) uses/requirements for 5G, which may include device densities of up to 1 million devices per square km. Even in circumstances in which the potential amount of data to be communicated per device is relatively low, problems in transmission of such data may be inherent simply due to the number of devices present on the network and may be amplified with regard to IMT-2030 and 6G where densities on the scale of 10 million devices per square km are envisioned in some future deployment scenarios.

In certain representative embodiments, data driven approaches for end-to-end network optimization may be implemented, for example due to the increasing complexity of the network configurations, deployment options, the new WTRU device types and/or the high density of devices. The approaches may involve applications to process WTRU measurement data from one, several, or all available wireless access measurements (e.g., from 3GPP, WLAN, and/or Bluetooth, among others) and one, several or all relevant WTRU peripherals (e.g. from Video data, from available sensors (e.g., a Barometer and/or an Accelerometer on the WTRU 102) and/or remote sensors remote from the WTRU 102, among others.

One or more Over The Top (OTT) applications may be implemented to communicate the WTRU data to the network. In the OTT applications the data format may not be guaranteed as it may be application specific and/or the data for OTT may be carried outside of the network by the OTT application and may be brought back into the network for analysis, which may increase the latency and/or load and may reduce the capacity to carry user data; and inter-vendor data formats and/or mechanisms of the OTT applications may not be standardized.

With respect to certain frameworks (e.g., the MDT framework), WTRU network measurement data and WTRU sensor or peripheral measurement data may be sent on separate paths. In the case of network measurement data, the path may be primarily via the control plane. In the case of WTRU sensor or peripheral measurement data, the respective path may be via the user plane. In consideration of the increase in potential applications of AI and ML and with a view towards continued network optimization, architectures/frameworks/apparatus and/or procedures may be implemented to improve the efficiency and/or flexibility in communicating requisite WTRU measurement data (and/or other sensor data and/or MDT measurement data) from the WTRU 102 to the RAN 104/113 or other network entities.

In certain representative embodiments, methods, apparatus and systems may be implemented to combine/multiplex different types of data (e.g., MDT and sensor data) on one single path which may be either (i) the control plane; (ii) the user plane; iii) or a hybrid of these two planes, for example to address a technology gap related to (1) selecting, (2) controlling and (3) performing transformation operations to WTRU measurement sources for MDT and/or WTRU sensor and peripheral measurements.

In certain representative embodiments, methods, apparatus and systems may be implemented to combine/multiplex different types of data (e.g., MDT and sensor data) on one single path which may be either (i) the control plane; (ii) the user plane; iii) or a hybrid of these two planes, for example to address a technology gap related to (1) selecting, (2) controlling and (3) performing transformation operations to WTRU measurement sources for MDT and/or WTRU sensor and peripheral measurements.

In certain representative embodiments, methods, apparatus and systems may be implemented to 1) multiplex data originating from (i) WTRU sensors and peripherals and (ii) WTRU MDT measurements; and 2) control the transport of the multiplexed data to the network via a unified path (e.g., CP/UP).

In certain representative embodiments, methods, apparatus and systems may be implemented for multiplexing communication of measurement data using one or more wireless paths by a user equipment (UE). The WTRU 102 may perform communication of measurement data, for example, by multiplexing communication of measurement data using control plane transport mechanisms and/or using user plane data transport mechanisms. The control plane transport mechanisms may include transmitting measurement data via a control plane wireless data path using a signaling radio bearer (SRB). The user plane data transport mechanisms may include transmitting measurement data via one or more user plane wireless data paths using a data radio bearer (DRB). The user plane data transport mechanisms may include transmitting measurement data via one or more user plane wireless data paths using an analytics radio bearer (ARB) which may be established in lieu of or in addition to the SRB and the DRB. The ARB may correspond to a destination or a termination point (e.g., at a network entity, the RU 206a, the DU 206b and/or the CU 206c, among others) which may be predetermined in the RAN, the core network or in another portion of the network, such as at a network data analytics function (NWDAF). The multiplexing between or among one or more of the SRB, the DRB, and/or the ARB 204c may be activated or performed according to a network state, a WTRU state, a threshold (e.g., a data amount threshold), a buffer status, an initial or current configuration of the WTRU 102 or an initial or current configuration of the network.

In certain representative embodiments, methods, apparatus and systems may be implemented for multiplexing of measurement data for communications using one or more wireless paths (e.g., a control plane path, a user plane path and/or another measurement path) in which the measurement data may include at least sensor measurement data (e.g., WTRU sensor measurement data and MDT measurement data).

In certain representative embodiments, methods, apparatus and systems may be implemented for a multiplexer (e.g., a control plane path, a user plane path and/or another measurement path) which performs multiplexing of measurement data for communications using one or more wireless paths in which the multiplexed data may be incorporated at a radio resource control (RRC) layer of the WTRU 102. In certain other representative embodiments, methods, apparatus and systems may be implemented for a multiplexer which performs multiplexing of measurement data for communications using the one or more wireless paths and the UE may be incorporated separately from the RRC layer of the WTRU 102.

In certain representative embodiments, methods, apparatus and systems may be implemented for configuring a UE for multiplexing of measurement data over one or more wireless paths. The network may configure the WTRU 102 to perform path selection in order to multiplex measurement data between one or more SRBs, one or more DRBs, and/or one or more ARBs 204c. The network and/or WTRU 102 may configure destinations or termination points of the one or more DRBs 204b and/or the one or more ARBs 204c. For example, the configuration of the destinations and/or termination points of the DRB 204b or the ARB 204c may be performed via RRC configuration.

Representative Configurations of WTRUs and RANs

Figure 2A:
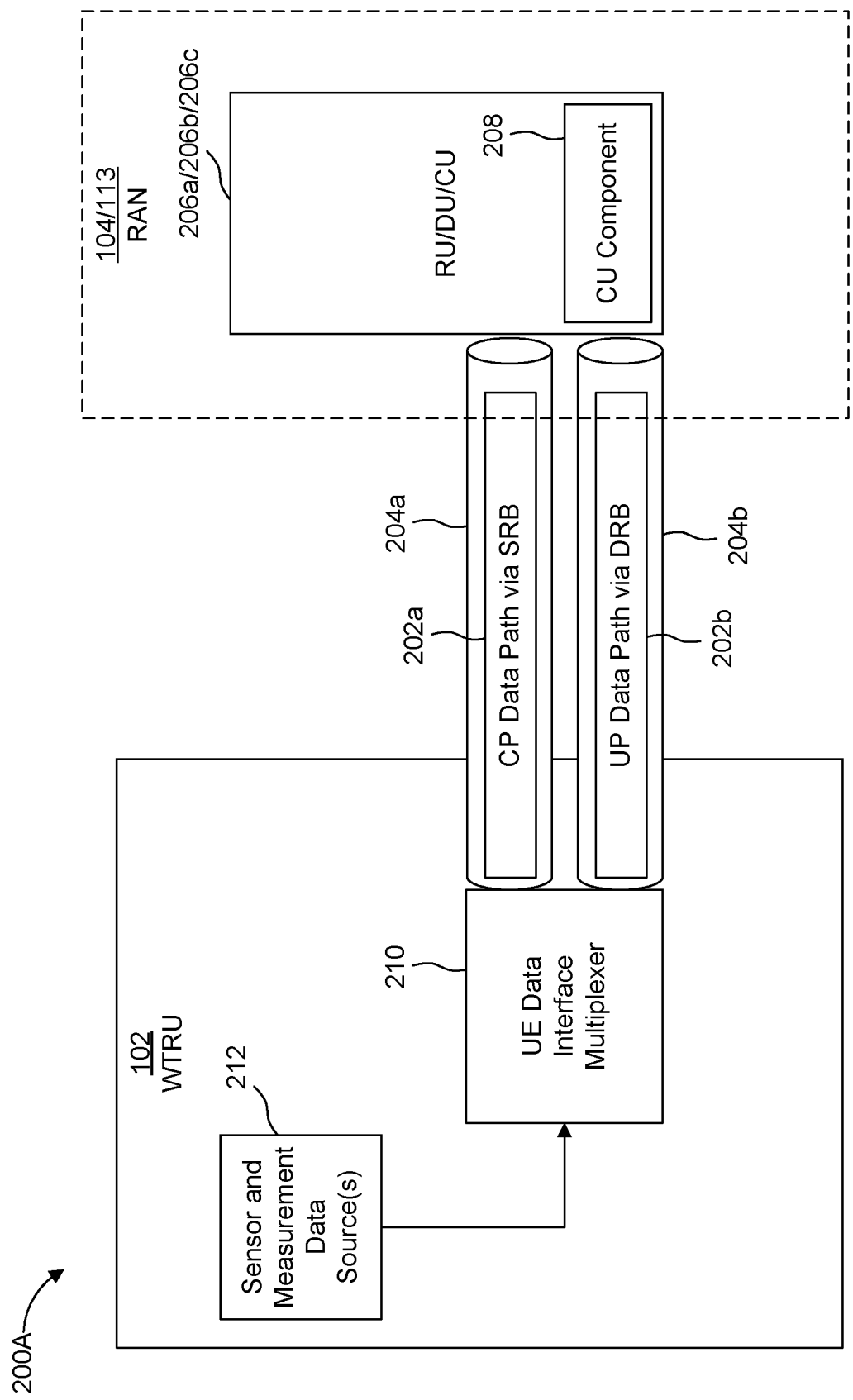
FIG. 2A is a diagram illustrating a representative configuration of a WTRU and a RAN and the configuration of a control plane path and a user plane data path.

FIG. 2A is a diagram illustrating a representative configuration 200a of a WTRU 102 and a RAN 104/113 and the configuration of a control plane (CP) data path 202a (e.g., associated with a SRB 204a) and a user plane (UP) data path 202b (associated with a DRB 204b).

In FIG. 2A, the CP data path 202a may be provided between the WTRU 102 and the RAN 104/113 via the SRB 204a, and the UP data path 202b may be provided between the WTRU 102 and the RAN 104/113 via the DRB 204b. The WTRU 102 may include a user equipment data interface multiplexer (UDIM) 210 that may be provided as an integrated component (e.g., as a part of the processor) or as a separate component which performs multiplexing of measurement data from a data source to the CP data path 202a and/or the UP data path 202b. On the network side (e.g., at the RAN 104/113), the control plane data path 202a and the user plane data path 202b may have a destination or termination point at a Remote Radio Unit (RU) 206a/the Distributed Unit (DU) 206b/the Central Unit (CU) 206c. It is contemplated that the CP data path 202a and the UP data path 202b may have a same destination or termination point at the RAN 104/113 which, for example, may be any of: the RU 206a, the DU 206b or the CU 206c, or may have different destination or termination points at the RAN 104/113. As one example, the CP data path 202a may terminate at the CU 206b and the UP data path 202b may terminate at the DU 206c, although other destination or termination point(s) combinations are equally able to be implemented.

Although tunneling to the endpoint is shown in the FIGS., in certain embodiments, the termination point (e.g., the RU 206a, the DU 206b, the CU 206c and/or an edge node) may forward/tunnel the data to another point (e.g., the RU 206a may be the termination point and may forward/tunnel the measurement data and/or sensor data to the DU 206b or the CU 206c). As another example, the forwarding/tunneling procedure may occur any number of times at other points in the network. For example, the DU 206b after receiving the forwarded measurement data and/or sensor data may further forward/tunnel the measurement data and/or sensor data to another point in the network (e.g., the CU 206c or an edge node).

Figure 2B:
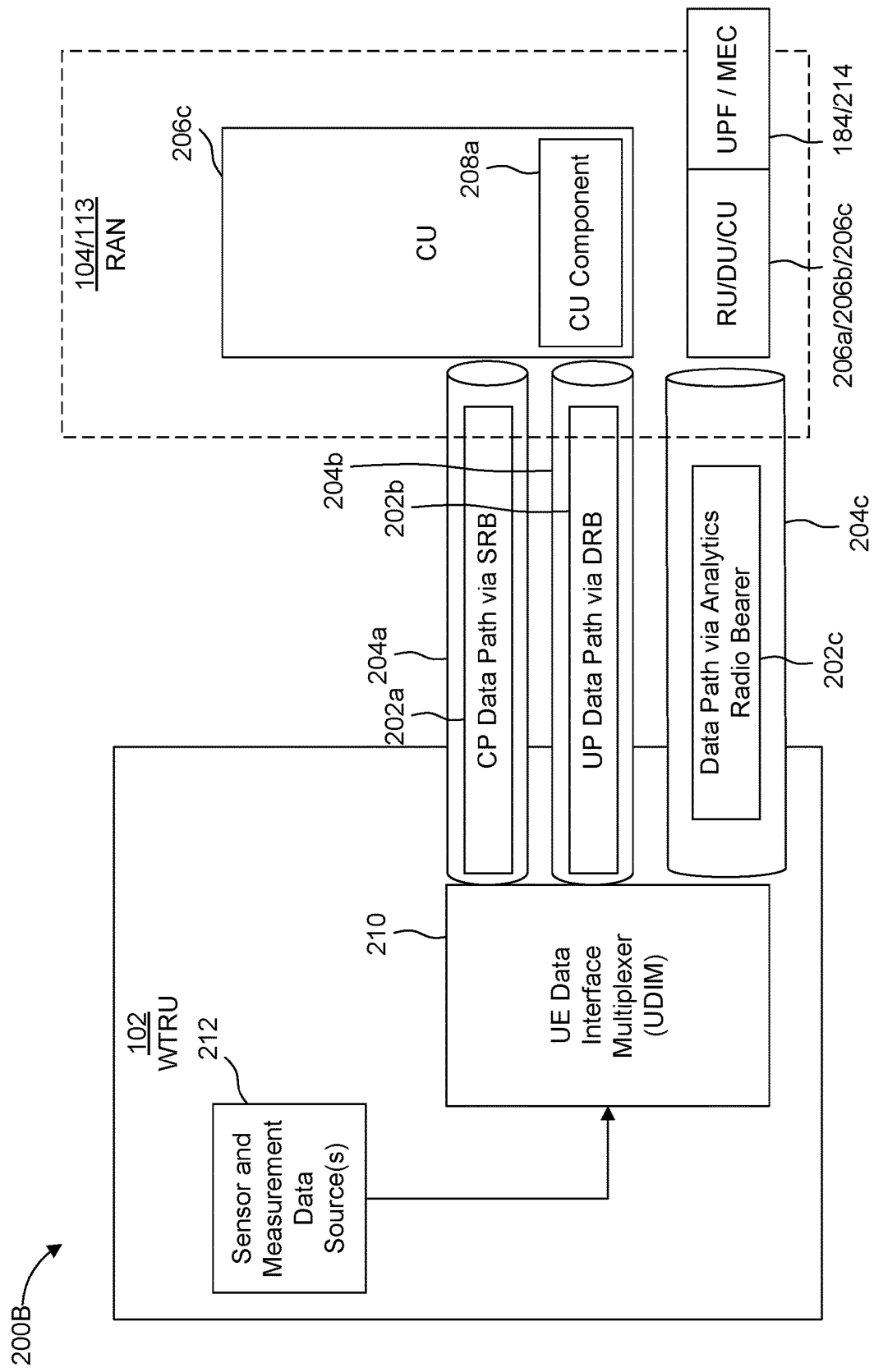
FIG. 2B is a diagram illustrating another representative configuration of a WTRU and a RAN and the configuration of a control plane path and a user plane data path, and in which another path (e.g., data path may be added thereto)

FIG. 2B is a diagram illustrating another representative configuration 200b of a WTRU 102 and RAN 104/113 and the configuration of a CP data path 202a and/or a UP data path 202b, and in which another path (e.g., data path) 202c may be added.

In FIG. 2B, the CP data path 202a may be provided between the WTRU 102 and the RAN 104/113 via an SRB 204a, and the UP data path 202b may be provided between the WTRU 102 and the RAN 104/113 via a DRB 204b. In lieu of or in addition to these paths, another path 202c (e.g., data path) may be provided between the WTRU 102 and the RAN 104/113/network via another radio bearer type referred to as an analytics radio bearer (ARB) 204c. Similar to FIG. 2A, a UDIM 210 may be provided as an integrated component or as a separate component which performs multiplexing of measurement data. In FIG. 2B, the UDIM 210 may perform multiplexing of measurement data between the CP data path 202a via the SRB 204a, the UP data path 202b via the DRB 204b, and/or the ARB 204c. At the RAN 104/113, the CP data path 202a via the SRB 204a, the UP data path 202b via the DRB 204b and/or the ARB 204c may have a destination or termination point at any of the RU 206a, the DU 206b and/or the CU 206c (e.g., a CU component 208a). It is contemplated that the CP data path 202a via the SRB 204a, the UP data path 202b via the DRB 204b and/or the ARB 204c may have a same destination or termination point at the RAN 104/113 which, for example, may be any of: the RU 206a, the DU 206b or the CU 206c, or may have different destination or termination points at the RAN 104/113. As one example, the CP data path 202a may terminate at the CU 206c or DU 206b and the UP data path 202b may terminate at the DU 206b. The ARB 204c may have a destination or termination point beyond the RU 206A/DU 206B/CU 206C such as at a user plane function (UPF) 184 or at an edge node (e.g., after the UPF), such as a multi-access edge computing (MEC) node 214.

As illustrated in FIGS. 2A and 2B, for example, the UDIM 210 may be configured to multiplex measurement data which may originate from 3GPP measurements, other sensor data received by the WTRU 102 or from WTRU sensors, such as video: (1) for transmission to a CPP and the RAN 104/113 may treat the received measurement data as MDT measurements and/or (2) for transmission to a UP data path 202b where the received measurement data may be transmitted to various network destinations. With this configuration the UDIM 210 may achieve utilization of (e.g., may multiplex) traditional 3GPP measurement data and also a variety of other sensor measurements. As an example, multiplexing the measurement data to be sent via a UP data path 202b may allow network operators to configure a dedicated network analytics slice that may be configured to a set of WTRUs 102 which are respectively contributing 3GPP measurement data and/or WTRU sensor measurement data for analytics purposes and/or for processing by an AI and/or ML algorithm. In certain representative embodiments, measurement data associated with the analytics slice and measurement data for MDT may be multiplexed to be communicated via separate paths, such as the SRB 204a and DRB 204b separately, or via a same path which allows for greater flexibility in the network.

Figure 3A:
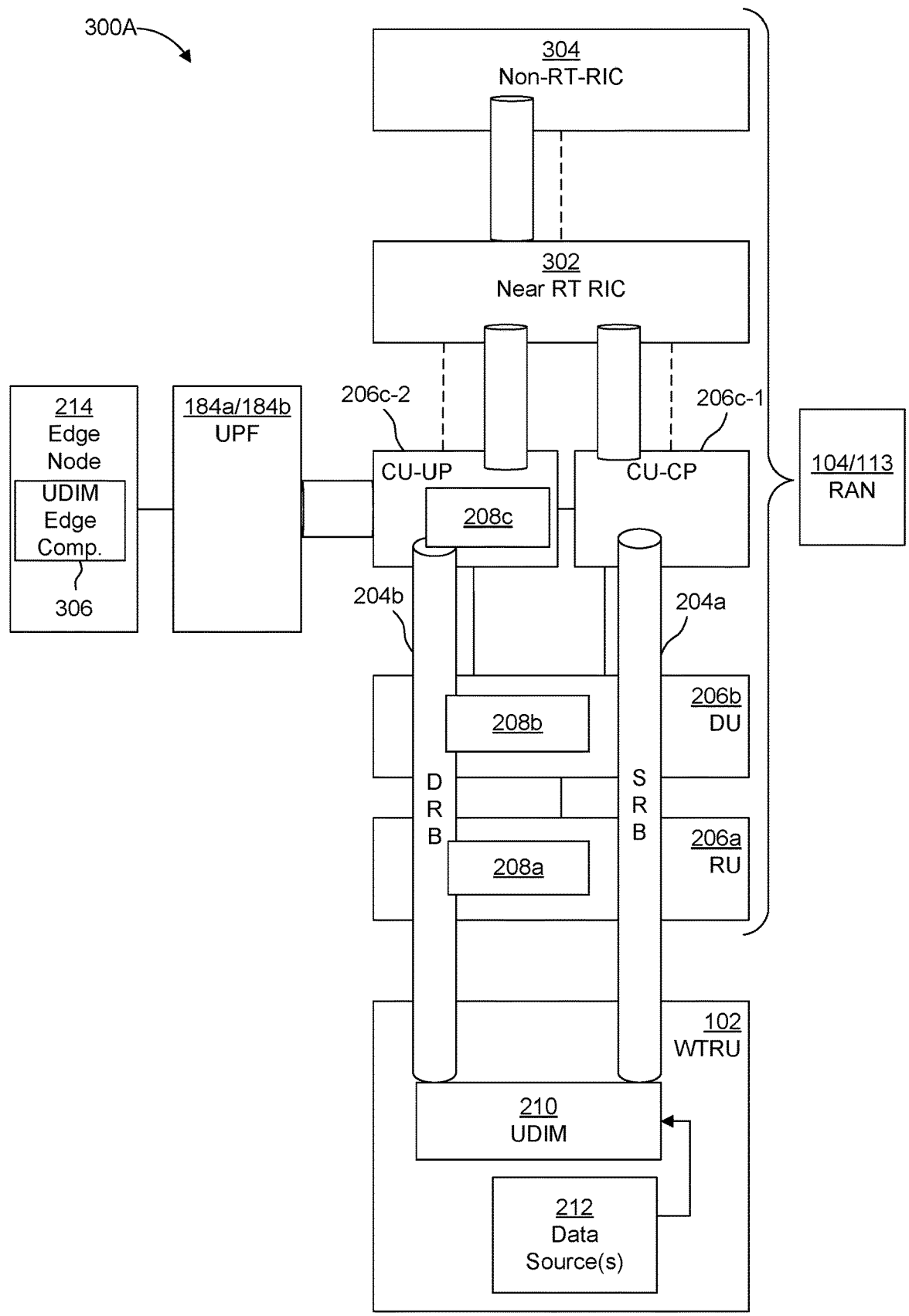
FIG. 3A is a diagram illustrating yet another representative configuration of a WTRU and a RAN and a respective configuration of a control plane path and a user plane data path.
Figure 3B:
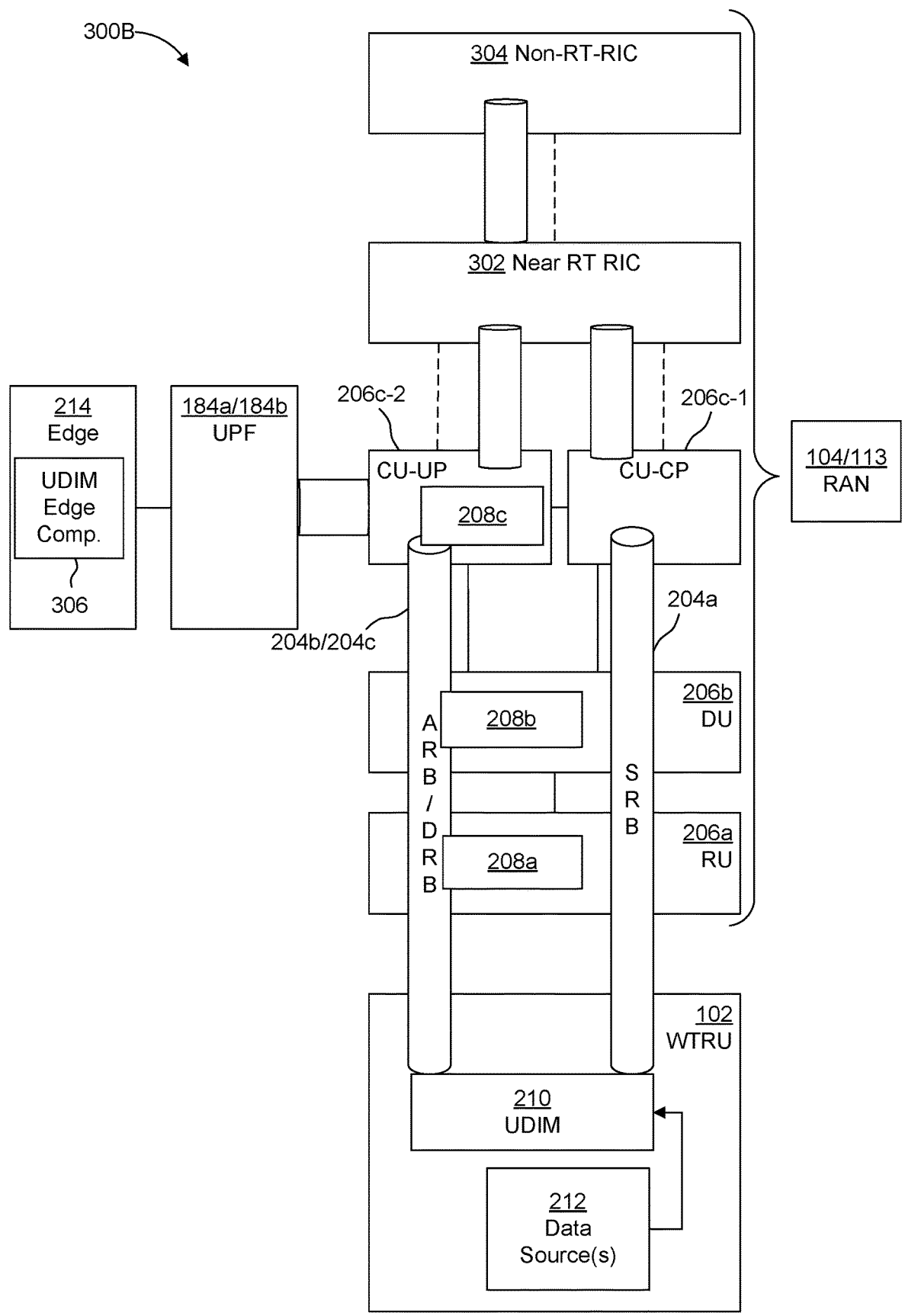
FIG. 3B is a diagram illustrating still another representative configuration of a WTRU and a RAN and a respective configuration of a control plane path and a user plane data path.

FIGS. 3A and 3B are diagrams illustrating other representative configurations 300a, 300b of a WTRU 102, a RAN 104/113, a CP data path 202a and a user plane data path.

In FIGS. 3A and 3B, various termination points are shown for the WTRU measurement data and/or the MDT measurement data, which may be multiplexed by the UDIM 210. The WTRU 102 may communicate with a central unit (CU) 206c of the RAN 104/113 via radio bearers (e.g., the SRB 204a, the DRB 204b, and/or the ARB 204c). In certain embodiments, the CU 206c may be logically or physically separated into a central unit of a control plane (CU-CP) 206c-1 of the RAN 104/113 to communicate with the WTRU 102 via a SRB 204a and a central unit of a user plane (CU-UP) 206c-2 of the RAN 104/113 to communicate with the WTRU 102 via a DRB 204b. The CU-CP 206c-1 and the CU-UP 206c-2 may communicate via one or more interfaces with a near-real time RAN intelligent controller (Near-RT RIC) 302 and the Near-RT RIC 302 may communicate with a non-real time RIC (Non-RT RIC) 304. The CU 206c may be collocated or split from a DU 206b and a RU 206a. In some instances, the Near-RT RIC 302 or the Near-RT RIC 304, and/or other portions of the RAN 104/113, may be based on O-RAN guidelines and/or specifications.

In certain embodiments, the RAN 104/113 may include a UPF 184a/184b which may communicate with the CU 206c via an interface. As shown in FIGS. 3A and 3B, the UPF 184a/184b may be coupled by an interface with the CU-UP 206c-2 . An edge node or other network node/device may reside in the network and may be coupled behind the UPF 184a/184b relative to the CU 206c (e.g., may have a data connection via the CU-UP 206c-2) as also shown in FIG. 3A, for example. In certain embodiments, the RAN 104/113 may be configured such that the WTRU measurement data and/or the MDT measurement data may be transmitted within a network slice, such as an analytics network slice, which, for example, may be implemented as a network slice selection assistance information (NSSAI) slice which is dedicated for analytics. For example, a Single Network Slice Selection Assistance Information (S-NSSAI) may be used to identify a network slice dedicated for analytics (e.g., an analytics slice). The S-NSSAI may include a slice/service type (SST) which refers to the expected network slice behavior in terms of features and services and/or a slice differentiator (SD) which is information that complements the SSTs to differentiate amongst multiple network slices of a same SST. An S-NSSAI may be represented as standardized values (e.g., S-NSSAI with a standardized SST value and no SD information) or as non-standardized values (e.g., S-NSSAI with an SST and an SD or a non-standardized SST values and no SD). An S-NSSAI with a non-standard value may identify a single Network Slice within a public land mobile network (PLMN) with which it is associated.

In FIGS. 3A and 3B, the CU-UP 206c-2 may include a CU component 208c which may serve as a termination point for the radio bearer (e.g., ARB 204c or DRB 204b) to be communicatively coupled to the UDIM 210 of the WTRU 102. The DU 206b may include a DU component 208b which serves as another termination point for the radio bearer to be communicatively coupled to the UDIM 210. The RU 206a may include a RU component 208a which serves as yet another termination point for the radio bearer to be communicatively coupled to the UDIM 210. The edge node 214 may include a UDIM edge component 306 which serves as yet another termination point for the radio bearer to be communicatively coupled to the UDIM 210. It should likewise be appreciated that the near-RT RIC 302 may serve as another termination point and that the Near-RT RIC 304 may serve as still another termination point. The WTRU measurement data and/or the MDT measurement data which is multiplexed by the UDIM 210 in the illustrated representation may have one or more of the termination points or may otherwise terminate at other locations in the RAN 104/113. While the UDIM 210 is configured to perform multiplexing operations with respect to the DRB 204b and the SRB 204a as in FIG. 3A and the UDIM 210 is configured to perform multiplexing operations with respect to the DRB 204b or the ARB 204c and the SRB 204a as in FIG. 3B, it should be appreciated that the UDIM 210 may perform multiplexing operations with respect to any of: the SRB 204a, the DRB 204b and/or the SRB 204a. Moreover, it should be appreciated that the UDIM 210 may perform multiplexing operations with respect to other wireless paths (e.g., via the control plane and/or the user plane) either separately or collectively with or using the types of radio bearers (e.g., DRBs, SRBs, and/or ARBs) described herein.

In certain embodiments, the measurement data which is to be multiplexed by the UDIM 210 may undergo processing (e.g., at the WTRU 102 or in another device) prior to being multiplexed by the UDIM 210 (e.g., may be pre-processed). Processing of WTRU sensor measurement data and/or MDT measurement data (e.g., at the WTRU 102) may avoid consuming resources by performing processing operations at the RAN 104/113 and network congestion whilst also accommodating and satisfying data governance rules, such as privacy regulations, to be respected in certain scenarios. The pre-processing may occur at the first device capable of such processing or may be handled exclusively at the RAN 104/113. In certain embodiments, the network (e.g., a network entity) can instruct the WTRU 102 to modify the processing of measurement data, such as altering a data model or data transformations applied to the measurement data at the WTRU 102 or at the peripheral sensors themselves, which may advantageously achieve improved scaling of the analytic slice of the network and may advantageously reduce network congestion.

Implementation of features disclosed herein may advantageously achieve increases in communication efficiency, reductions in latency, and may offer network operators improved control of network analytics and the collection of WTRU measurement data. For example, the network may be configured to control data flow and replication of measurement data at the WTRU 102. In some cases, doing so can lead to energy efficiency increases due to lower computational load in the network. As shown in FIGS. 2A and 2b, for example, the UDIM 210, the SRB 204a, the DRB 204b and/or the ARB 204c may, from the viewpoint of the network operator, configure a virtual data bus between the WTRU 102 and the RAN 104/113. Placement of the multiplexing of the UDIM 210 at the WTRU 102 may greatly simplify network implementation and may allow for easier scaling (e.g., up-scaling) of the network. The UDIM 210 may allow greater network control over congestion with respect to the control plane and/or the user plane (for example by switching portions or all of the transmission of the UDIM 210 output (e.g., MDT and/or sensor data) between the control plane and the user plane via the various radio bearers disclosed herein.

As described above, WTRU measurement data may be transmitted to the RAN 104/113 in order for the RAN 104/113 to optimize resources. For example, the RAN 104/113 may use the WTRU measurement data to dynamically optimize allocations of resources. When the WTRU measurement data is transmitted in the user plane or analytics plane, there may be intermediate destination points in which reading of the WTRU measurement data occurs. In certain embodiments, the termination or destination points of the WTRU measurement data may be included in the configuration information provided to initialize the UDIM 210 or to establish a DRB 204b or an ARB 204c. For example, the UDIM 210, the RU 206a, DU 206b, CU 206c, or UDIM Edge component 306 may be configured to maintain information which associates the ARB 204c with one or more WTRU measurement or sensor identifiers and the respective component may associate the proper measurement data with one or more data models (e.g., intended data models). Similar information may be maintained for the DRB 204b or the SRB 204a.

Representative Configurations of WTRU and UDIM

Figure 4:
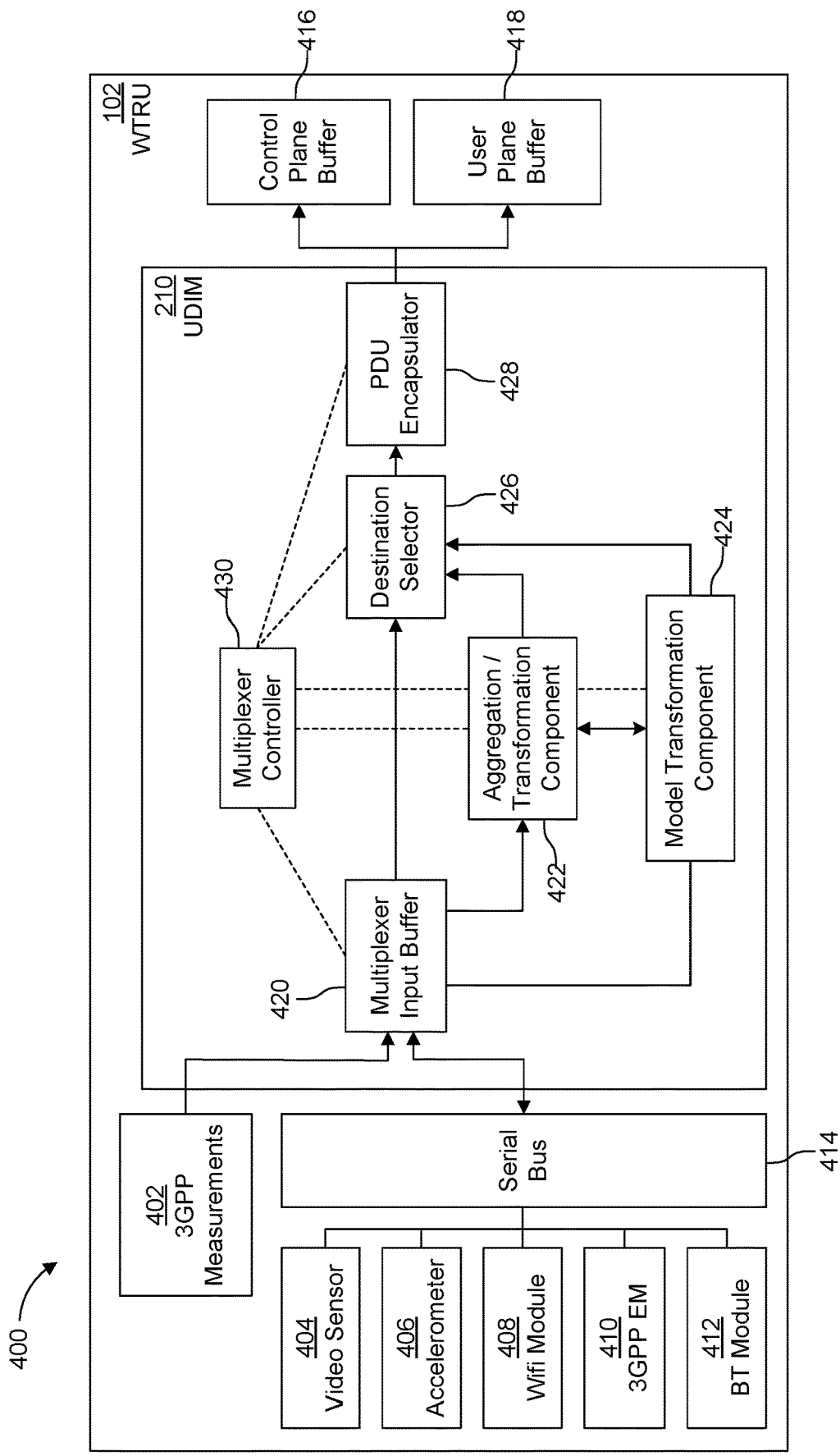
FIG. 4 is a diagram illustrating a representative configuration of the WTRU and a user equipment data interface multiplexer (UDIM)

FIG. 4 is a diagram illustrating a representative configuration 400 of the WTRU 102 and the UDIM 210.

In FIG. 4, the UDIM 210 may be an individual component in the WTRU 102, or, in other configurations, the UDIM 210 may be integrated or incorporated with one or more other components of the WTRU 102. The UDIM 210 may be communicatively coupled to one or more data sources to receive 3GPP measurement data 402, such as radio resource control (RRC) specified measurements or MDT specified measurements and to receive other WTRU measurement data. For example, the WTRU 102 may include, or be coupled to, one or more peripherals as data sources such that the WTRU measurement data may include WTRU measurement data associated with such peripherals. For example, the WTRU measurement data may include video data from a video sensor 404 such as a camera or CMOS sensor, accelerometer data from an accelerometer 406, WiFi data from a WiFi module 408, 3GPP extending measurement (EM) data 410, or Bluetooth data from a Bluetooth (BT) module 412. In certain embodiments, the UDIM 210 may receive or transmit WTRU measurement data which corresponds to one or more particular sensors or peripherals whereas in other certain embodiments the UDIM 210 may receive or transmit WTRU measurement data which corresponds to all peripherals or all sensors or a combination thereof. In certain embodiments, the data source may be, for example measurements from another device such as in a V2V or V2X environment (e.g., using a device-to-device (D2D) and/or sidelink channel).

Within the UDIM 210, a logical configuration and a process flow from a serial bus 414 to a control plane buffer 416 and a user plane buffer 418 provide multiplexing operation with respect to the data sources and/or received data at the WTRU 102. In FIG. 4, the WTRU measurement data and 3GPP measurement data may be received directly or through a bus or the like, which may be either a standardized or proprietary interface. As illustrated in FIG. 4, the serial bus 414 may couple the UDIM 210 to receive measurement data at a multiplexer input buffer 420 from various data sources. The multiplexer input buffer 420 may be coupled to an aggregation/transformation component 422, a model transformation component 424, and a destination selector 426. The destination selector 426 may be coupled to a PDU encapsulator 428. The PDU encapsulator 428 may be coupled to the control plane buffer 416 and a user plane buffer 418. The control plane buffer 416 may be coupled to and/or may use a control plane transport mechanism such as a SRB 204a. The user plane buffer 418 may then be coupled to and/or may use one or more data plane transport mechanisms such as a DRB 204b and/or an ARB 204c. A multiplexer controller 430 may be configured to control, either directly or indirectly, the foregoing components (e.g., logical components).

In certain embodiments, the WTRU 102 or the UDIM 210 may be configured to operate according to (1) an on-demand measurement mode, (2) a periodic measurement mode and (3) an event triggered measurement mode at the WTRU 102. The on-demand measurement mode may be triggered at the WTRU 102 by: (1) an operator/user of the WTRU 102 manipulating the keypad 126 or touchpad 128, or (2) the RAN 104/113 (e.g., based on a network entity or gNB 180 requesting measurement data from the WTRU 102 or the like). In the periodic measurement mode, the WTRU 102 or UDIM 210 may be configured with a measurement transmission behavior which configures the WTRU 102 to transmit measurement data, for example, when/on condition that a periodic timer expires (e.g., is determined to expire) or the like. In the event-triggered measurement mode, the WTRU 102 or UDIM 210 may be configured to reference one or more specified events which cause a transmission operation to occur such as when one or more specified measurements exceeds one or more specified thresholds or the WTRU 102 travel to a specific location. It should be appreciated that transmission of measurement data through the UDIM 210 may be triggered or otherwise caused to occur in modes or by events other than the three modes described above.

In the case of event-triggered measurements, for example, the transmission of measurement data may be triggered by: (1) direct sensor readings (e.g., a scalar value of temperature) or (2) multi-dimensional data, such as video sensor signals. For example, the WTRU 102 may be configured to transmit video sensor data as the measurement data through the UDIM 210 to the network when an event that is previously specified or signaled by the network occurs (e.g., is determined by the WTRU 102 to occur). In certain embodiments, the UDIM 210 may be connected to a processing module and/or circuit or the like that may perform local processing for video (e.g., a convolutional neural network processing unit), and, when the UDIM 210 receives a network configured event from this processor, the UDIM 210 is triggered to perform transmission of measurement data such as video packets to one or more particular termination points of the network. In certain embodiments the triggering may be based on direct sensor readings from one or a plurality of sensors. For example, the direct sensor reading may be used with a set of rules or policies to determine whether a trigger has occurred. In certain embodiments, sensor fusion may be used prior to determining whether a trigger has occurred. For example, multiple sensor reading may be used (fused) to determine an improved accuracy for the location of the WTRU 102. This improved location (e.g., fused sensor information) may be used to determine whether to trigger the UDIM 210.

As illustrated in FIG. 4, the UDIM 210 may receive measurement data at the multiplexer input buffer 420. The received measurement data may be single values or may be encapsulated as data packets having header information about a data format of measurement data contained therein. In certain embodiments, the measurement data may be updated to specific register addresses which are accessible to the multiplexer input buffer 420 via the serial bus 414.

Figure 5:
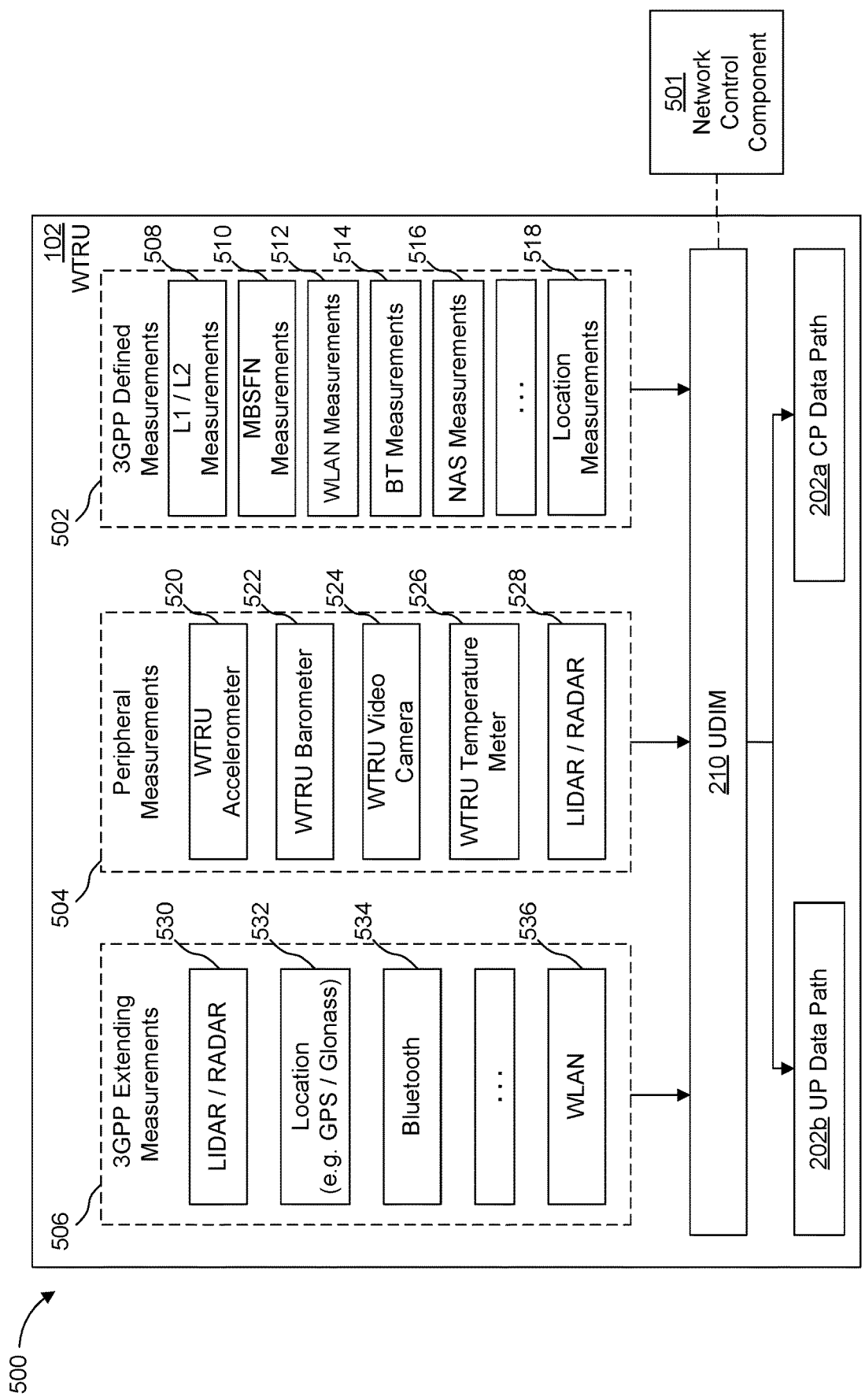
FIG. 5 is a diagram illustrating a representative configuration of measurement data types, peripheral types and sensors types which may be associated with, included in, received by, or generated at the WTRU or the UDIM and also illustrating a network control line for control of the UDIM.

FIG. 5 is a diagram illustrating a representative configuration 500 of 3GPP defined measurements 502 data types, peripheral measurements 504 data types and 3GPP EM 506 types which may be associated with, included in, received by, or generated at the WTRU 102 or the UDIM 210 and also illustrating a network control component 501 for control of the UDIM 210.

In FIG. 5, the UDIM 210 may be associated with sensors or peripherals that are defined in the scope of 3GPP or may be associated with one or more sensors or peripherals that are identified by the network using, for example, control messaging which is described herein.

The UDIM 210 may receive one or more types of 3GPP defined measurements or measurement data. The UDIM 210 may receive one or more types of peripheral measurements or peripheral measurement data. Further, the UDIM 210 may receive one or more types of measurements or peripheral measurement data which serve as extensions to the 3GPP defined measurements or measurement data. In certain embodiments, the 3GPP defined measurements 502 or measurement data received by the UDIM 210 may include one or more of Layer 1 (L1)/Layer 2 (L2) measurements 508, multicast broadcast over frequency single network (MBFSN) measurements 510, Wireless Local Area Network (WLAN) measurements 512, Bluetooth (BT) measurements 514, non-access stratum (NAS) measurements 516, location measurements 518, or the like. In certain embodiments, the peripheral measurements 504 or peripheral measurement data received by the UDIM 210 may include one or more of measurements or measurement data from a WTRU accelerometer 520, a WTRU barometer 522, WTRU video camera 524 (e.g., CMOS sensor data, video camera data), WTRU temperature meter 526, LIDAR/RADAR 528, proximity sensor, infrared sensor, pressure sensor, light sensor, ultrasonic sensor, smoke detector, gas sensor, alcohol sensor measurements, optical positioning sensor measurements, ultrasonic positioning sensor, magnetic positioning sensor, or the like. In certain embodiments, the peripheral measurements or peripheral measurement data extending the 3GPP defined measurements or measurement data (e.g., 3GPP extending measurements 506) received by the UDIM 210 may include one or more of measurements or measurement data from LIDAR/RADAR 530, location 532 (e.g., GPS signal data, GLONASS signal data or GALILEO signal data), Bluetooth 534, WLAN 536, a WTRU protocol stack, or the like. The WTRU protocol stack data may include one or more of packet counters such as buffer counters, queue counters, watchdog counters or dropped packet counters, available resource measurements, packet delay measurements, hybrid automatic repeat request (HARQ) counters, PDCP packet counters, status report information, dual connectivity measurements, radio link control (RLC) measurements such as retransmission counters or packet segmentation counters, MAC measurements, statistical information of UP header overhead per DRB 204b or ARB 204c, or the like.

It should be appreciated that the foregoing measurements, measurement data, signals and information are merely examples and those skilled in the art understand that other measurements, measurement data, signals and information may be associated with, included in, received by, or generated at the WTRU 102 or the UDIM 210. Further, the terms "measurements" and "measurement data" may be used interchangeably herein to refer any set of 3GPP defined measurements, peripheral measurements, WTRU sensor measurements, and WTRU protocol stack data.

Returning to FIG. 4, after being received by the multiplexer input buffer 420, the measurement data may be forwarded to the aggregation/transformation component 422 or the model transformation component 424. The aggregation/transformation component 422 may be configured to read multiple serially input values (e.g., 1,2,3,3,3) and may perform a pre-defined operation on the values such as averaging through an averaging window. For example, with an averaging window size of 5 values, the aggregation/transformation component 422 reads 5 sensor values from the multiplexer input buffer 420 and outputs an averaged value (e.g., 2.4) to the destination selector component 426 (e.g., destination selector). Other example operations include scalar or complex operations performed for integer or floating-point values representing measurements that are aggregated from multiple inputs to a single output measurement.

Further, the aggregation/transformation component 422 may be configured to receive the data as a vector and perform one or more transformation operations using an input vector(s) that is provided by the multiplexer controller 430. In certain embodiments, the multiplexer controller 430 may receive the one or more transformation operations and/or the input vector(s) from the network (e.g., a network entity).

Still further, the aggregation/transformation component 422 may be configured to filter the measurement data based on a time interval. For instance, the aggregation/transformation component 422 may have a discard timer that is set to zero after every transmission. Between zero and a timer threshold the aggregation/transformation component 422 ignores received input values or packets and discards them. The discard operation may be performed at the aggregation/transformation component 422 or may occur by not reading the values or packets from the register address(es) or the multiplex input buffer 420 while the discard timer is lower than the time threshold. When the discard timer exceeds the time threshold, the aggregation/transformation component 422 may transmit each input value or packet to the next component in the pipeline. In certain embodiments, the value of the timer threshold may be modified by the network such as by setting an explicit value for the discard timer or by setting a data budget for the UDIM 210 in the multiplexer control. The data budget may be set in terms of bytes per second, for example.

The measurement data may be forwarded to the model transformation component 424 from the multiplexer input buffer 420. The model transformation component 424 may be configured to map the measurement data of a given sensor or peripheral from one data format to another data format. In certain embodiments, the data format mapping may be controlled by the multiplexer controller 430, for example, by specifying a particular data model that is associated with one or more data source identifiers of one of more of the sensors or peripherals of the WTRU 102. Measurement data transformed by the model transformation component 424 may be output to the destination selector 426. It should be appreciated from FIG. 4 that the measurement data from the multiplexer input buffer 420 may be aggregated at the aggregation/transformation component 422 prior to transformation at the model transformation component 424, or vice versa, before being output to the destination selector 426. It should also be appreciated that, in certain embodiments, the destination selector 426 may receive input measurement data from the multiplexer input buffer 420 without being subjected to aggregation or model transformation.

Upon or after receiving the measurement data, the destination selector 426 may be configured to determine whether a destination of the received measurement data is a destination in the control plane (CP), in the user plane (UP) or destinations in both of the control plane and the user plane. In certain embodiments, the destination selector 426 may be configured to select multiple CP or multiple UP destinations. The destination selector 426 may also be configured to associate the received measurement data with a packet header which may include one or more of IP information, QoS Class, a source address, a destination IP address and the like. Measurement data may then be output from the destination selector 426 to the PDU encapsulation component 428.

The PDU encapsulator 428 may be configured to encapsulate the measurement data received from the data selector with an appropriate header based on an injection point of the encapsulated measurement data. For example, the header may specify that the encapsulated data is a service data adaptation protocol Service Data Unit (SDAP SDU), a packet data convergence protocol (PDCP) SDU, a CP packet, a radio link control (RLC) SDU, or a media access control (MAC) SDU. From the PDU encapsulator 428, the encapsulated data packet is output to the CP buffer, the UP buffer or both the CP buffer and the UP buffer in accordance with the selection at the destination selector 426.

In certain embodiments, the measurement data received at the UDIM 210 includes one or more of peripheral measurements 504, 3GPP defined measurements 502, or 3GPP extending measurements 506 (e.g., measurement data extending the 3GPP defined measurements). This data may take different formats. For example, the header of the encapsulated data packet may include a predetermined data identifier to signal to the network that all or a subset of the different measurement data is combined or encapsulated together.

The UDIM 210 may include the multiplex controller 430 which is configured to control one or more of the multiplex input buffer 420, the aggregation/transformation component 422, the model transformation component 422, the destination selector 426, and the PDU encapsulator 428.

Representative WTRU and UDIM Control

In certain embodiments, the UDIM 210 may be configured to multiplex measurement data in response to control messaging from the network control component 501 of the network.

Figure 6:
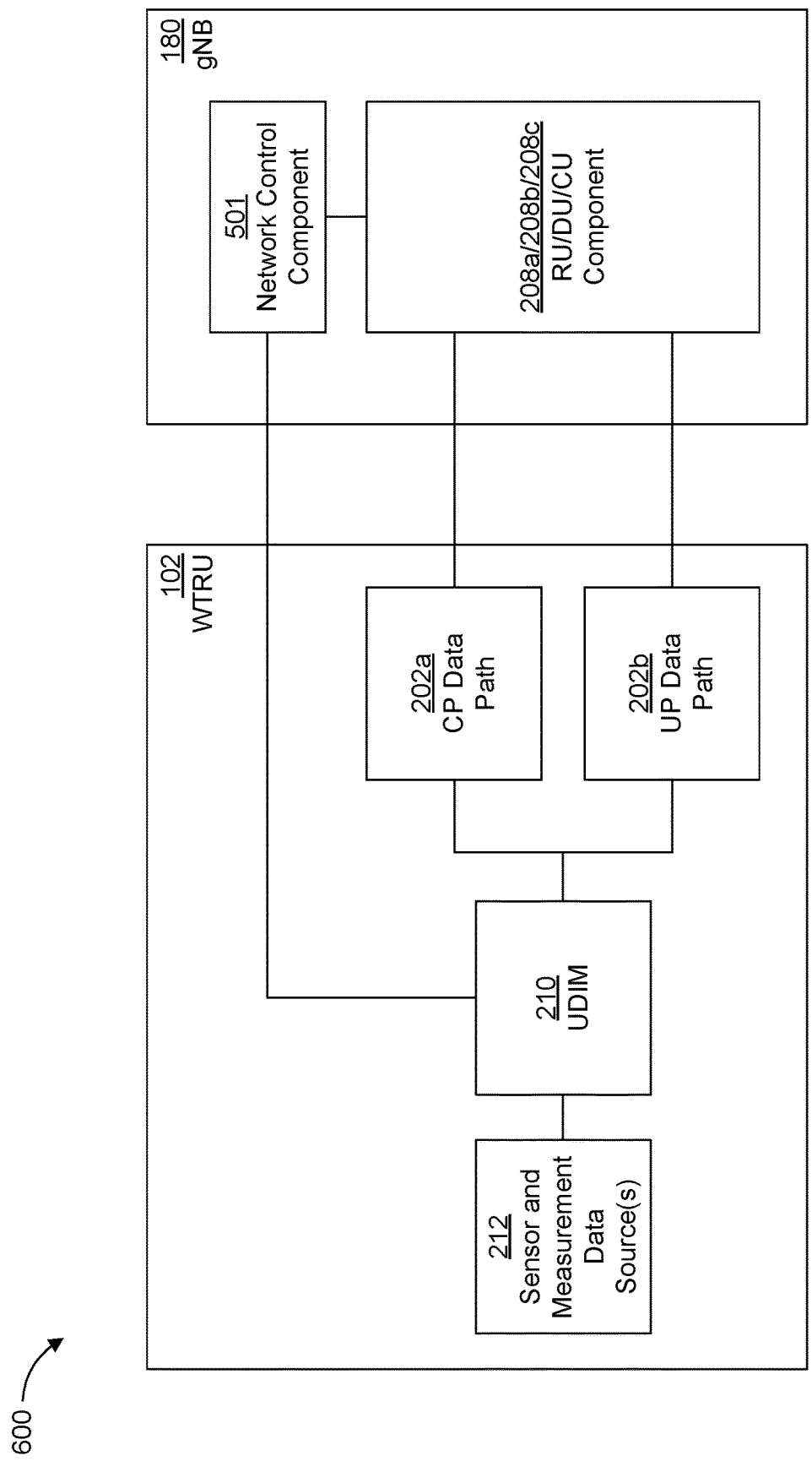
FIG. 6 is a diagram illustrating a representative configuration for controlling the WTRU (e.g., via a gNB)

FIG. 6 is a diagram illustrating a representative configuration 600 for controlling the WTRU 102 via a network entity (e.g., a gNB or other network entity).

In FIG. 6, the UDIM 210 at the WTRU 102 is communicatively coupled to receive control messaging from the network control component 502. For example, the UDIM 210 at the WTRU 102 may operate according to control messaging according to RRC protocol from the UDIM control component 501 at the network entity (e.g., the gNB 180). As another example, the UDIM control component 501 may be located beyond the gNB 180 in the network such as behind a UPF 184 in the network or at an edge node 214 of the network. In response to or after receiving control messaging, the UDIM 210 may be configured to perform multiplexing of measurement data between a CP data path 202a such as via a SRB 204a and a UP data path 202b such as via a DRB 204b. In certain embodiments, the UDIM 210 may be configured to perform multiplexing between the UP data path 202b such as via the DRB 204b and another data path using a different type of radio bearer such as the analytics radio bearer (ARB) 204c, for example, to transmit analytics data to a network entity. For example, the DRB 204b may be associated with a user service or application server beyond the network whereas the ARB 204c may be associated with a destination in the network. As illustrated in FIG. 6, the gNB 180 may be configured with the UDIM control component 501 to control the UDIM 210 and may be configured with a peer RU, DU and/or CU component 208a/208b/208c to receive the measurement data from UDIM 210 via multiplexing between a CP data path 202a and/or a UP data path 202b. In other configurations, the measurement data may be multiplexed to the UP data path 202b to a destination beyond the network entity or the gNB 180 such as an edge server. In still other configurations, the measurement data may be multiplexed to the RU, DU or CU 206a/206b/206c as separate destinations or termination points via the DRB 204b, the ARB 204c or both the DRB 204b and the ARB 204c.

In certain embodiments, the control messaging may be based on RAN control messaging. For example, the radio bearers may be categorized into DRBs for user plane data and SRBs for control plane signaling. In certain embodiments, an additional radio bearer (e.g., an ARB 204c) may be established for analytics and/or measurement data that are neither control plane signaling or user plane data. For example, the WTRU 102 may be configured to establish an ARB 204c as a special type of DRB 204b or as a DRB 204b with a special indicator and the ARB 204c may have one or more data termination points in the network. By establishing the ARB 204c, the UDIM 210 may be configured to perform multiplexing to collect and/or transmit the measurement data when the WTRU 102 is in a RRC_IDLE mode or a RRC_INACTIVE mode. The ARB is used to transmit RRC measurements and sensor measurements via data plane to the RAN 104/113.

For example, the network (e.g., a network entity) may send a configuration (e.g., information) to the WTRU 102 and the WTRU 102 may configure itself (e.g., the WTRU 102 may implement the configuration) in a RRC_CONNECTED mode to perform measurements in a measurement configuration. The network may configure the WTRU 102 to report the performed measurements in accordance with the measurement configuration. The network (e.g., a network entity) may send a configuration (e.g., information) to the WTRU 102 and the network may configure the WTRU 102 to perform a conditional configuration evaluation in accordance with a conditional configuration. The measurement configuration may be provided by the network dedicated signaling such as by using a 'RRCReconfiguration' or a 'RRCResume' signaling or message. In certain embodiments disclosed herein, the network may configure the WTRU 102 to perform measurements according to set WTRU sensor identifiers or to perform set NR or E-UTRA measurements. The WTRU 102 may report the performed measurements via a DRB 204b or an ARB 204c.

The measurement configuration may include a list of reporting configurations and there can be one or multiple reporting configurations per measurement object. In certain embodiments disclosed herein, a reporting configuration may include one or more of: (1) reporting criterion that triggers the WTRU 102 to send a measurement report, (2) reference signal (RS) type that indicates the RS that the WTRU 102 uses for beam and cell measurement results (e.g., synchronization signal/physical broadcast channel (SS/PBCH) block or channel-state information reference signal (CSI-RS)), (3) reporting format that indicates quantities per cell and per beam that the WTRU 102 includes in the measurement report (e.g. RSRP) and other associated information such as the maximum number of cells and the maximum number beams per cell to report, or (4) measurement paths for the WTRU 102 to transmit measurement data (e.g., configured measurement data as indicated in the measurement configuration). Multiple measurement paths can be established/operated (e.g., indicated to be established) simultaneously and/or concurrently and the UDIM 210 may multiplex measurement data between or among one or more of the SRB 204a, the DRB 204b and/or the ARB 204c according to the reporting configuration.

The measurement configuration may include at least one measurement identify that defines list of measurement identities where each measurement identity may link one measurement object with one reporting configuration. By configuring multiple measurement identities, the WTRU 102 may be configured to link more than one measurement object to a same reporting configuration, as well as to link more than one reporting configuration to a same measurement object. A measurement identity may also be included in the measurement report that triggered the reporting and may server as a reference to the network.

The measurement configuration may include at least one quantity configuration that defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam. In certain embodiments disclosed herein, the quantity configuration may be defined/set for each SRB 204a, DRB 204b and/or ARB.

The WTRU 102 procedure may be implemented according to a received message includes a measurement configuration (e.g., a 'measConfig' information element). In certain embodiments disclosed herein, the measurement configuration may include a measurement path configuration (e.g., a 'MeasurementPathConfig' field description) and the WTRU 102 may be configured to transmit configured measurements, as specified in the measurement configuration, to a radio bearer list (e.g., a 'RadioBearerList' field description), as specified in a radio bearer path configuration (e.g., a 'RadioBearerPathConfig' field description). The WTRU 102 may be configured to (1) transmit measurements associated with measurement identifiers, which may be associated with specific radio bearer identifiers (e.g., 'radioBearerId') that are specified in a radio bearer list (e.g., 'RadioBearerList'), (2) perform any filtering translation operation specified per radio bearer identifier (e.g., 'radioBearerId'), and/or (3) associate any control path/data path configured in a radio bearer path configuration (e.g., 'RadioBearerPathConfig') with a measurement identifier (e.g., a 'measId'). In certain embodiments in which the WTRU 102 is sending measurements to multiple paths, such as by a multiplexing operation of the UDIM 210, a configuration (e.g., a radio bearer path or measurement destination configuration) may include measurement destination points. Measurement identifiers may, for example, be directly associated with destination IP addresses as destination points.

Returning to FIG. 5, the UDIM 210 may be configured to receive external control from the network. In certain embodiments, a policy controller may provide the external control to the UDIM 210. For example, the policy controller may be located in the RAN 104/113 and may provide control to the UDIM 210 via RRC signaling or messaging. As another example, the policy controller may be located in a 5G Core network and may provide control to the UDIM 210 via NAS signaling of a policy change regarding a UDIM policy. In some instances, the policy change may be associated with an existing WTRU 102 policy or it may be a standalone policy related to WTRU 102 and Network analytics. The UDIM policy may contain one or more configurations that are associated with the UDIM 210 and indicate a particular behavior between the WTRU 102 and the ARB 204c.

The UDIM policy may contain or include information regarding any of (1) one or more plane switching policies (CP, UP or AP switching policies), (2) one or more PDU session identifiers and/or network slice selections, (3) one or more radio bearer identifiers, (4) one or more sensor to radio bearer associations, and/or (5) one or more radio bearer destinations. In certain embodiments, a plane switching policy may specify conditions in which the UDIM 210 is to perform multiplexing/switching between the CP and the UP, such as SRB 204a to DRB 204b switching, SRB 204a to ARB 204c switching, DRB 204b to ARB 204c switching, and vice versa.

In certain embodiments, the UDIM policy may include a plane switching policy which indicates a switching threshold that may be data rate based (e.g., a kilobytes per second (kbps) threshold value), dropped packet based (e.g., a packet drop error rate), and/or another packet statistic metric or indication. As another example, the plane switching policy may be signaling to the WTRU 102 from the network (e.g., a network entity) when the WTRU 102 receives a reconfiguration. After receiving the reconfiguration, the WTRU 102 may initiate such a switch (e.g., from one type of plane to another type of plane. In some embodiments the switching may be based on in-band signaling. In certain embodiments, the RAN 104/113 may initiate a CP to UP switching operation by sending a control element to the WTRU 102 or the UDIM 210 via in-band signaling and, upon reception of the control element, the UDIM 210 may initiate the CP to UP switching operation. In still another example, the plane switching policy may be based on WTRU 102 implementation. For example, the WTRU 102 may be configured to initiate a CP to UP switching operation when a communication buffer exceeds a predetermined fill level or when the WTRU 102 drops packets containing measurement data (e.g., the drop error rate reaches a threshold level).

In certain embodiments, the UDIM policy may include at least one PDU session identifier or network slice selection assistance information (NSSAI) specified for the UDIM configuration. For example, the PDU session identifier may indicate to the UDIM 210 a particular PDU session for the UDIM configuration. As another example, the network slice selection identifier may indicate to the UDIM 210 a particular slice of the network for the UDIM configuration.

In certain embodiments, the UDIM policy may include at least one radio bearer identifier. Each radio bearer identifier may indicate a respective SRB 204a, DRB 204b, or ARB that is associated with the particular UDIM 210. Further, the UDIM policy may include multiple radio bearer identifiers which simultaneously and/or concurrently identify multiple DRBs, for example, to the UDIM 210.

In certain embodiments, the UDIM policy may include at least one sensor to radio bearer association or at least one peripheral to radio bearer association. As described elsewhere herein, one, some or each sensor or peripheral may be incorporated in or otherwise provided to the WTRU 102. For example, each respective association may be indicative of a relation between a sensor or peripheral identifier (e.g., a device identification or the like) and one or more radio bearer identifiers. One, some or each respective association may be supplemented with or otherwise include an association with one or more sensor or peripheral identifiers and a data model for measurements generated therefrom.

In certain embodiments, the UDIM policy may include one or more radio bearer destination configurations. For example, a radio bearer configuration may include information regarding a destination or termination point of the radio bearer. The destination configuration may specify a PDU session destination such as the UPF 184, a RU 206a, a DU 206b or the like. In some embodiments, the destination configuration may specify plural destinations or terminations points for a DRB 204b or an ARB 204a.

Representative ARB Identification

At the time of reception of the measurement configuration that specifies measurement path configuration information, such as when a 'measConfig' information element is received that includes a 'MeasurementPathConfig' information element, the WTRU 102 may be configured to determine whether each path specified in the measurement path configuration information is to be distinguished for analytics usage. In certain embodiments, predetermined radio bearer identifiers may be selected and may be used for analytics (e.g., the predetermined radio bearer identifiers are reserved for analytics usage). For example, each ARB 204c may have an identifier that is predetermined to be dedicated only for the ARB 204c. In some instances, the ARB identifier can be a numeric identifier ranging from 0 to an upper limit value such as 'MAX ARBs'. MAX ARBs may be defined as a maximum number of DRBs set per PDU session, per WTRU 102 or per signaling header (e.g., 8 bits providing identifiers from 0 to 255). In other instances, each ARB 204c may be provided with unique identifiers to indicate reservation for analytics use.

In other certain embodiments, the measurement path configuration information may include an extension, such as a flag, which is indicative of one or more radio bearer identifiers being specified for analytics usage. Each ARB 204c may be identified as a special type of DRB 204b by configuration information. For example, RRC configuration can be amended to include a flag (e.g., 'IS_ANALYTICS_DRB') or the like to identify an existing DRB 204b for analytics usage. In certain embodiments, the network (e.g., a network entity) may configure the flag to distinguish a DRB 204b as being an ARB 204c. In such instances, the network and the WTRU 102 may be configured to operate such that a DRB 204b so configured with the flag may have the characteristics described herein of an ARB 204c.

Representative ARB Destination Configuration

The UDIM policy may include one or more radio bearer destination configurations. In the case of ARBs, the policy configuration of an ARB 204c may include ARB destination configuration information. For example, the network (e.g., the network entity) may specify the ARB destination configuration information according to static criteria such as deployment locations of network components associated with analytics processing. As another example, the ARB destination configuration information may be specified according to dynamic criteria such as network load or computational load at one or more physical nodes of the network. In a further example, the ARB destination configuration may be network defined as a number of preselected or predetermined end points that may be indicated by destination type or destination address. By way of example the ARB destinations (e.g., only, the ARB destinations) may include at least a RU 206a, DU 206b, or CU 206c of a RAN 104/113. The ARB destinations may include a UPF 184 or a network service of a core network 106/115. In certain embodiments, the network service may be a network data analytics function (NWDF) and may be based on an analytics identifier or the like. The ARB destinations may include an operator edge node, a cloud server (e.g., specified by public IP address), or another WTRU 102 (e.g., specified by an IPv6 address) of an In-Data network. It should be appreciated that other ARB destinations may be specified as would be understood by those skilled in the art.

Figure 7:
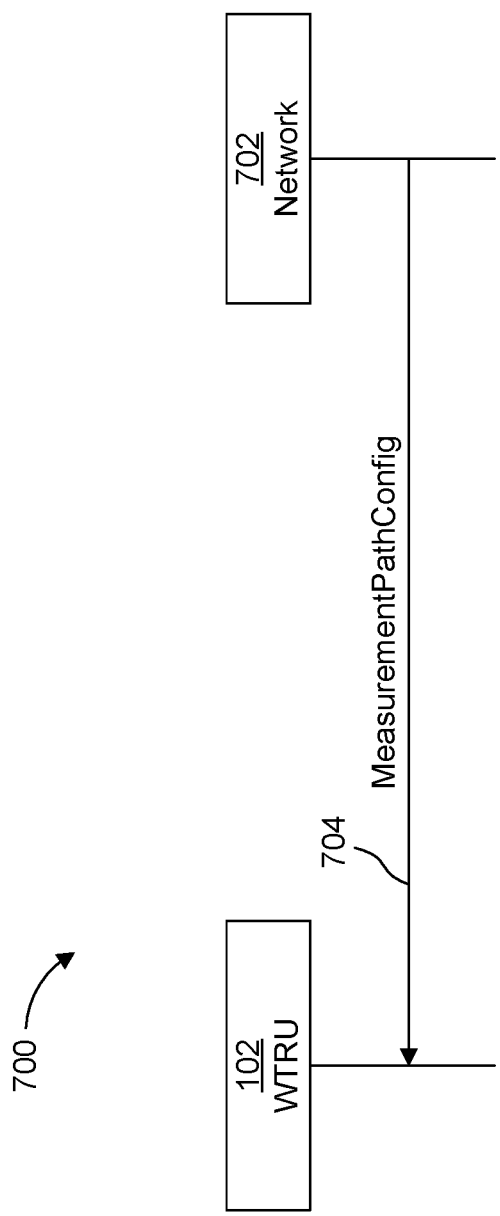
FIG. 7 is a diagram illustrating a representative messaging scheme between the network (e.g., a network entity) and the WTRU.

FIG. 7 is a diagram illustrating a representative messaging scheme 700 between the network (e.g., a network entity, a gNB 180 or an AMF 184) and the WTRU 102.

In FIG. 7, the network (e.g., the network entity, the gNB 180 or the AMF 184) may communicate a message which includes the measurement path configuration information. In certain embodiments, as described above, the measurement path configuration may be included in a measurement configuration message such as a 'measConfig' information element.

The UDIM 210 may be configured to operate in online or offline modes. In certain embodiments, the online and offline modes may include RRC states of RRC_CONNECTED, RRC_INACTIVE or RRC_IDLE. In an offline mode, such as when the WTRU 102 loses connectivity or the RRC state is changed, the UDIM 210 may be configured with a predetermined, local destination path for configured measurement data. In certain embodiments, the measurement configuration may specify the local destination path, such as a predetermined file or predetermined memory space for the WTRU 102 or UDIM 210 to write the configured measurement data. The measurement configuration may include a file write size in bytes or an allocated memory space in bytes. The measurement configuration may include information specifying the WTRU 102 or UDIM 210 behavior when a written data quota is exceeded. For example, when a specified written data quota is exceeded, the WTRU 102 or UDIM 210 may be configured to: (1) overwrite the last configured measurement data, (2) do nothing, or (3) remove all or a portion of the configured measurement data and start writing new configured measurement data. As another example, the measurement configuration may include information specifying the WTRU 102 or UDIM 210 to force a transition to a connected mode when a condition is satisfied (e.g., when the specified written data quota is exceeded). As yet another example, the may specify to measurement configuration may include information specifying the WTRU 102 or UDIM 210, when a condition is satisfied (e.g., when the specified written data quota is exceeded), to switch to transmitting measurement data over the control plane while in an idle mode.

The UDIM configuration may include post offline transmission quota. For instance, when the WTRU 102 has been buffering large amounts of data while in the RRC_IDLE/RRC_INACTIVE states. For example, after the WTRU 102 reestablishes a connection (e.g., and transitions to the RRC_ACTIVE state), the network via messaging may determine a priority for transmission of the large amounts of data buffered and may enable the WTRU 102 to send the buffered data based on an increased priority. After the buffered data is reduced to a threshold level, the WTRU 102 may resume a standard transmission quota for the analytic measurements data.

Upon transitioning to an online mode, such as after the WTRU 102 changes/transitions to the RRC_CONNECTED state, the WTRU 102 may be configured to transmit the written measurement data to the one or more paths specified by the measurement path configuration. The measurement configuration may include or indicate one or more of the following with regard to the transition to the online mode: (1) a threshold (e.g., a byte amount) at which the UDIM 210 switches data paths, (2) a path direction (e.g., CP to UP or UP to CP), (3) a DRB 204b, a SRB 204a, and/or an ARB identifiers of data destination(s), and/or (4) a mode change direction (online to offline or vice versa), etc. The mode change direction may indicate the RRC state change direction (e.g., RRC_IDLE to RRC_CONNECTED, RRC_CONNECTED to RRC_IDLE, RRC_IDLE to RRC_INACTIVE, RRC_INACTIVE to RRC_IDLE, RRC_INACTIVE to RRC_CONNECTED, or RRC_CONNECTED to RRC_INACTIVE).

Representative WTRU Protocol Stack Configuration

Figure 8A:
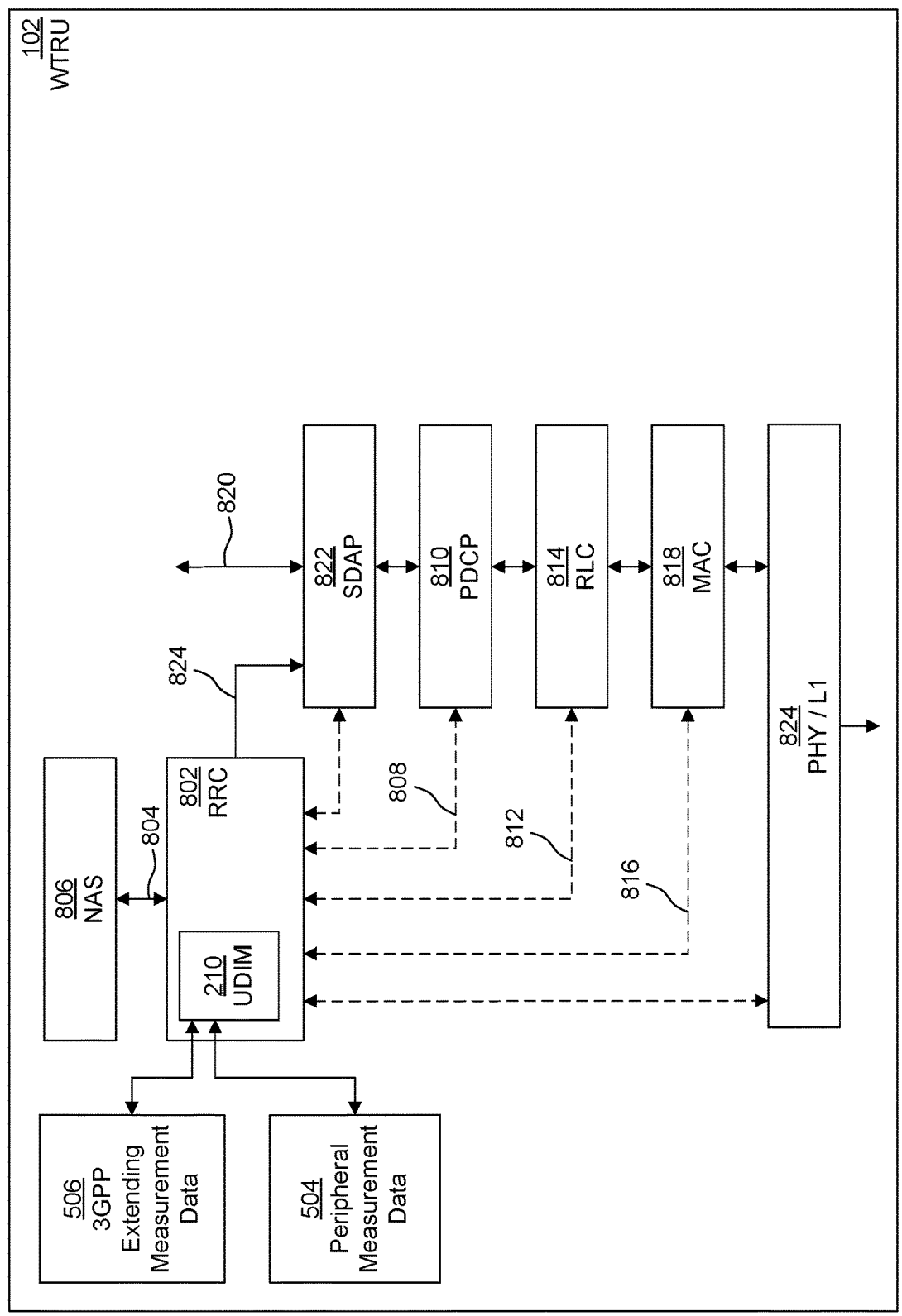
FIG. 8A is a diagram illustrating a representative configuration of the UDIM (e.g., at the WTRU) with respect to a protocol stack of the WTRU.

FIG. 8A is a diagram illustrating a representative configuration 800a of the UDIM 210 at the WTRU 102 with respect to a protocol stack of the WTRU 102.

In FIG. 8A, the WTRU 102 includes UP and CP protocol stacks as those skilled in the art would understand. For example, the RRC layer 802 may be configured to communicate: (1) NAS control messaging 804 with the NAS layer 806, (2) PDCP control messaging 808 with the PDCP layer 810, (3) RCL control messaging 812 with the RLC layer 814 and/or (4) MAC control messaging 818 with the MAC layer 818, etc. User traffic 820 may be output as a SDU to an upper layer relative to the SDAP layer 822. In certain embodiments, the UDIM 210 may be disposed as a component and/or sublayer in an RRC layer 802 and the RRC layer 802 may be configured with one or more interfaces to receive the peripheral measurements 504 data and the 3GPP extending measurements 506 as shown in FIG. 8A. As for the 3GPP defined measurements or measurement data, the UDIM 210 may be configured to use a RRC measurement path similar to or the same as that used for MDT measurements. At the UDIM 210, the PDU encapsulator 428 may encapsulate data as a RRC PDU which may include an SDAP SDU and transmit the encapsulated data to any of: the CP and/or UP. For example, the output of the UDIM 210 may be encapsulated in a RRC PDU 824 and sent to the SDAP layer for transmission to the network (e.g., a network entity in accordance with the established destination point).

Figure 8B:
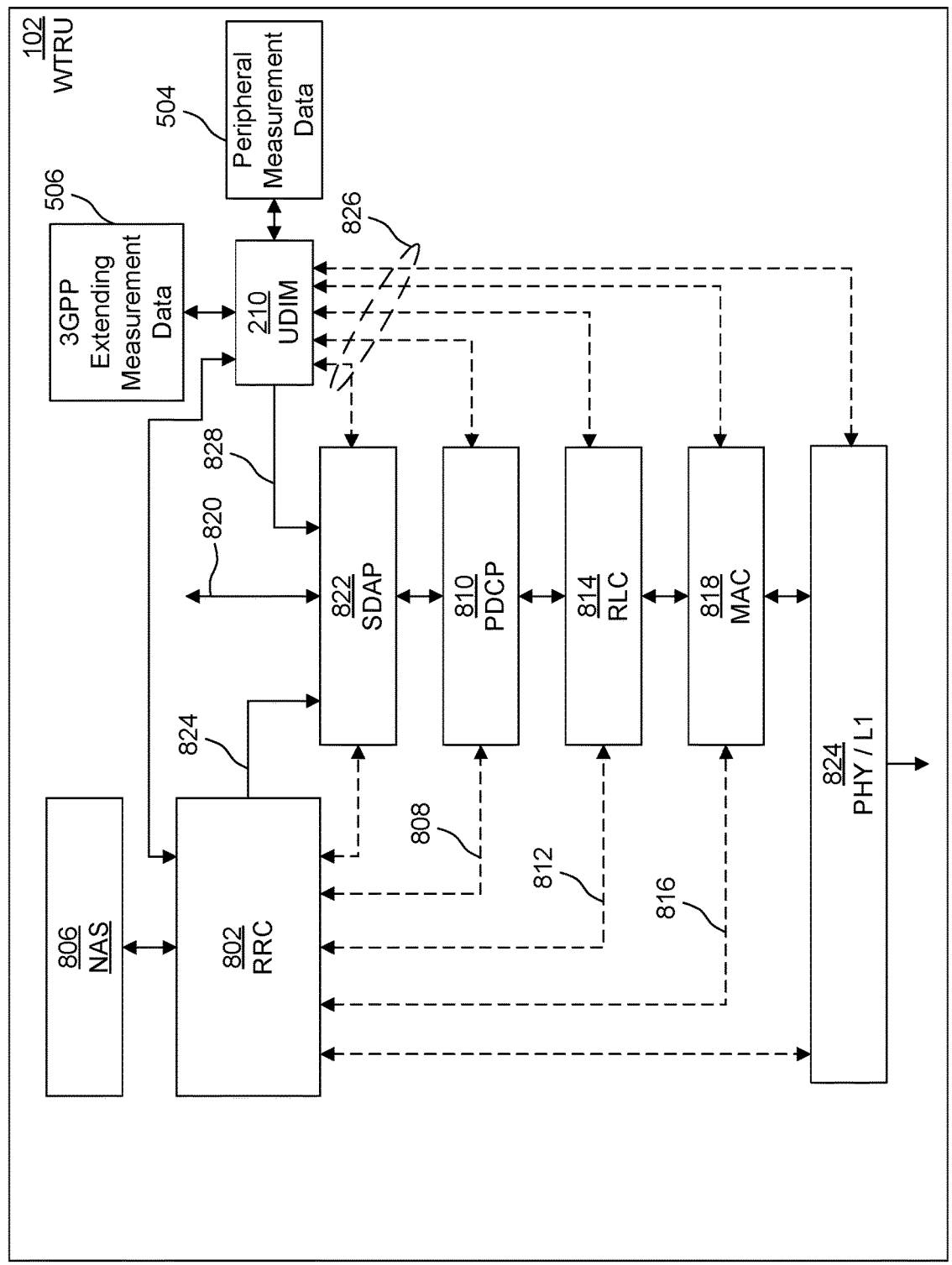
FIG. 8B is a diagram illustrating another representative configuration of the UDIM (e.g., at the WTRU) with respect to a protocol stack of the WTRU.

FIG. 8B is a diagram illustrating another representative configuration 800b of the UDIM 210 at the WTRU 102 with respect to a protocol stack of the WTRU 102.

In FIG. 8B, the WTRU 102 includes UP and CP protocol stacks similar to FIG. 8A. The UDIM 210 may be disposed as a component outside of the RRC layer 802. In the configuration, the UDIM 210 may be configured to receive the 3GPP defined measurements or measurement data from the RRC layer 802 or may receive similar measurements or measurement data 826 from the SDAP, PDCP, RLC, MAC and PHY layers 822, 810, 814, 818 themselves. Further, the UDIM 210 may be configured with one or more interfaces to receive the peripheral measurement data 504 and the 3GPP extending measurement data 506. At the UDIM 210, the PDU encapsulation component (50) may encapsulate data as a UDIM PDU which includes an SDAP SDU and may transmit the encapsulated data to any of: the CP and/or UP. For example, the output of the UDIM 210 may be a UDIM PDU which may be sent to the SDAP layer 822 for transmission to the network (e.g., a network entity in accordance with the established destination point).

In other configurations beyond those shown in FIGS. 8A and 8B, the UDIM 210 may be configured to interact with or be implemented at higher layers than those illustrated to facilitate the UDIM operations and to associate measurement data with at least one network configured QoS flow identifier (QFI) and/or at least one IP address. For example, the UDIM 210 may perform multiplexing operation at a higher layer in cases in which measurement data is transmitted past the UPF 184 via the UP.

Representative UDIM Control Process Flows

Figure 9:
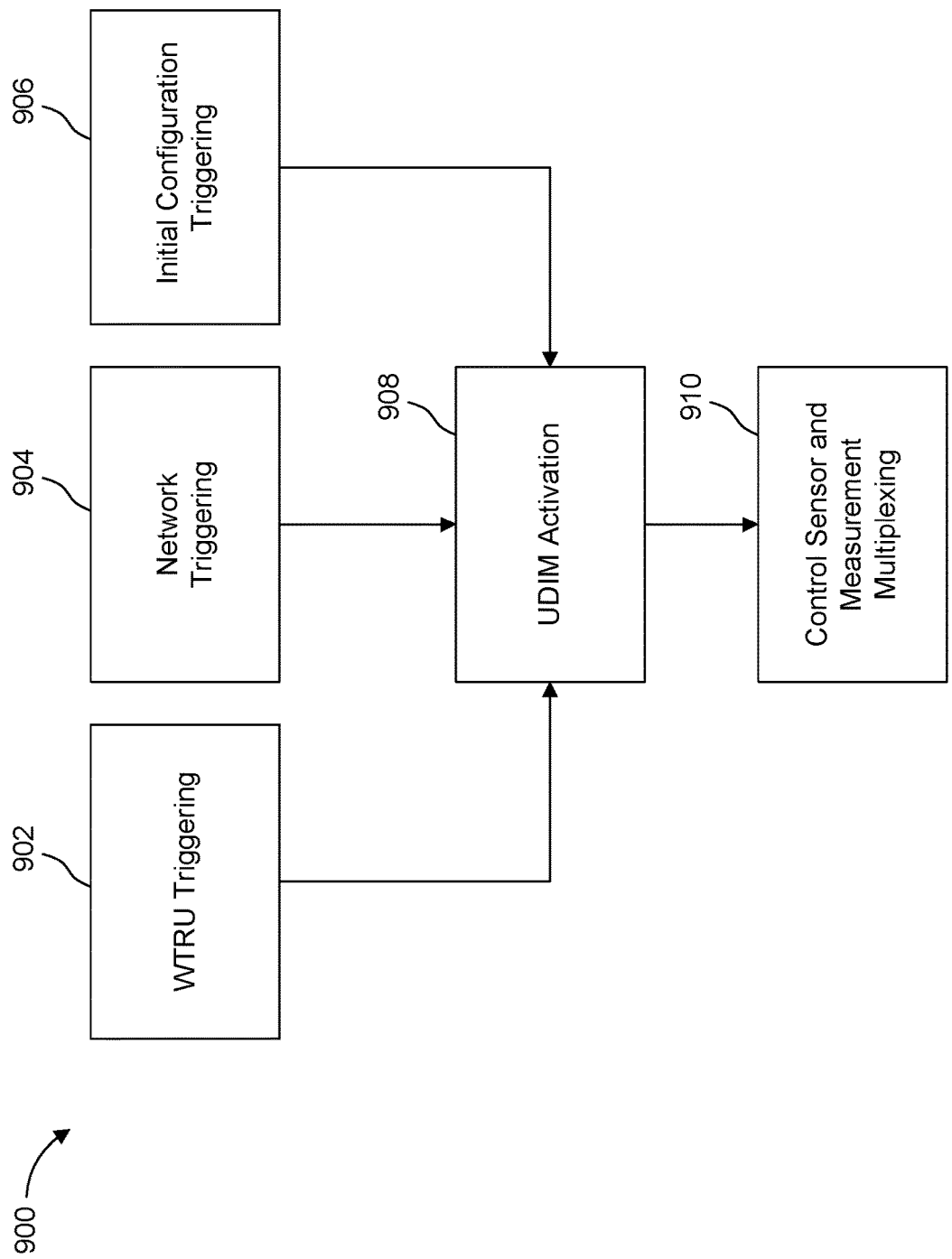
FIG. 9 is a diagram illustrating representative configurations of various activation mechanisms, e.g., to activate multiplexing operations at the UDIM.

FIG. 9 is a diagram illustrating representative configuration 900 of various triggering mechanisms to activate multiplexing operations at the UDIM 210.

In FIG. 9, multiplexing operation at the UDIM 210 may be activated at 908 by WTRU triggering at 902, network triggering at 904, and/or initial configuration triggering at 906. As one example, multiplexing processing at the UDIM 210, such as the process flow described with respect to FIG. 4, may be activated, triggered or otherwise started in accordance with receiving input at the WTRU 102 or determining a condition has occurred at the WTRU 102. In certain embodiments, the received input may be made by the WTRU 102 or in response to or after receiving input at the WTRU 102 such as via the keypad 126 or touchpad 128. In certain embodiments, the WTRU 102 may activate the multiplexing processing at the UDIM 210 when data to be transmitted via the CP has exceeded the CP capacity and a path change is performed. As a second example, multiplexing processing at the UDIM 210, such as the process flow described with respect to FIG. 4, may be activated, triggered or otherwise started in accordance with receiving control messaging from the network (e.g., a network entity such as a gNB or AMF, among others). In certain embodiments, the control message may be based on RRC signaling. As another example, the WTRU 102 may be provided with an initial configuration which may include one or more network specified conditions which activate, trigger and/or start multiplexing processing at the UDIM 210. In certain embodiments, the initial configuration may specify one or more network thresholds which activate multiplexing at the UDIM 210. For example, activation may occur when a maximum allowed CP data transmission amount exceeds a specified or signaled threshold. The multiplexing of the UDIM 210 may be performed and the output encapsulated in RRC PDUs for transmission via the CP or the output encapsulated in SDAP SDUs for transmission via the UP. In certain embodiments, the encapsulation may be switched such that the transmission of the analytics measurements is transitioned: (1) from the UP via the DRB 204b to the CP via the SRB 204a, (2) from the CP via the SRB 204a to the UP via the DRB 204b, (3) from the UP via the DRB 204b to the analytics plane (AP) via the ARB 204c, from the CP via the SRB 204a to the AP via the ARB 204c or via an analytics slice, or any combination thereof, or vice versa.

Figure 10:
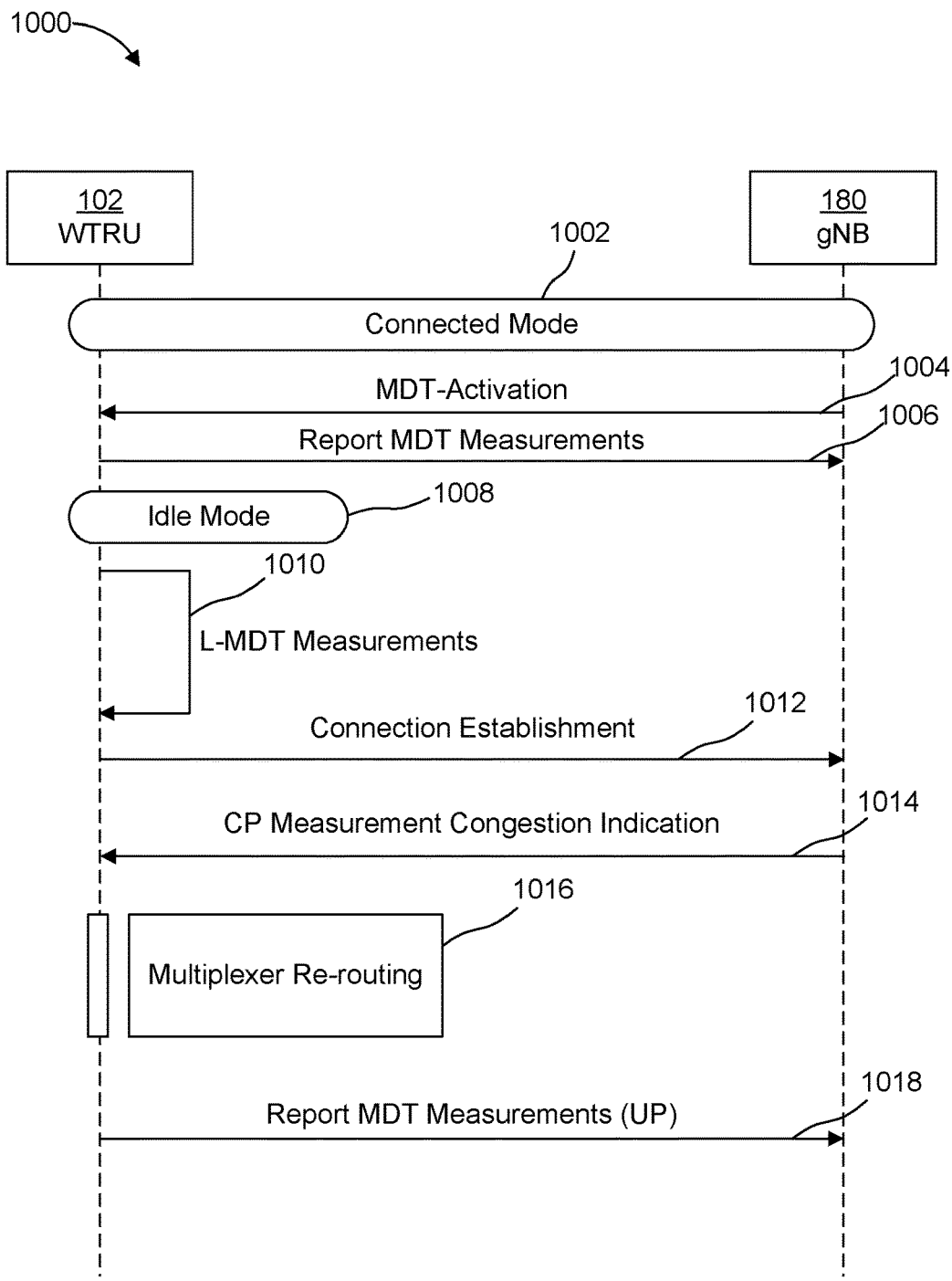
FIG. 10 is a diagram illustrating a multiplexing operation activation in the case of network triggering (e.g., triggering by a network entity)

FIG. 10 is a diagram illustrating a multiplexing operation procedure 1000 in the case of network triggering.

In FIG. 10, the WTRU 102 is in a connected mode at 1002, such as a RRC_CONNECTED state and is communicatively coupled to the network (e.g., via the gNB 180). The gNB 180 or the AMF 184 may transmit an MDT activation message to the WTRU 102 at 1004. Upon receiving the MDT activation message, the WTRU 102 may report the MDT measurements to the network (e.g., the gNB 180 or the AMF 184 among others) at 1006. At a later time, the WTRU 102 may enter an idle mode at 1008 and may proceed to collect or store MDT measurements (e.g., logged MDT (L-MDT) measurements) at 1010. After the L-MDT measurements are collected or stored, the WTRU 102 may perform a connection establishment procedure with the network (e.g., the gNB 180) at 1012 and may subsequently receive a CP measurement congestion indication from the gNB at 1014. The CP measurement congestion indication may correspond to the case that a CP data transmission amount has exceeded a specified threshold. The UDIM 210 may perform multiplexing re-routing at 1016 to switch one or more control paths via the SRB 204a that are specified in the CP measurement congestion indication to one or more data paths via DRB 204b, via ARB 204c or via a combination thereof.

Figure 11:
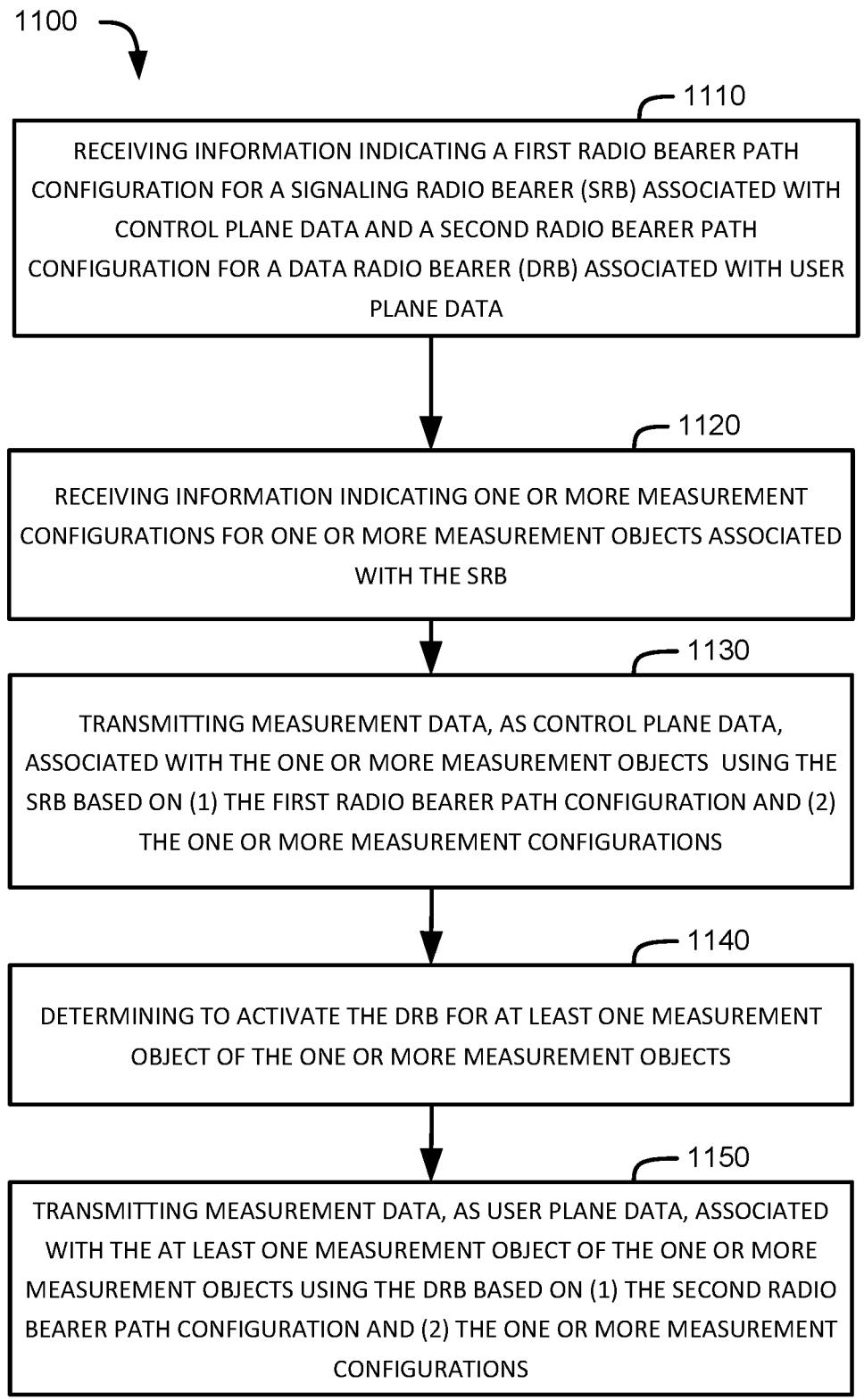
FIG. 11 is a diagram illustrating a representative procedure which may be implemented by a WTRU for performing radio bearer multiplexing.

FIG. 11 is a diagram illustrating a representative procedure 1100 which may be implemented by a WTRU 102 for performing radio bearer multiplexing. As shown in FIG. 11, the procedure 1100 may begin at 1110 with receiving information indicating a first radio bearer path configuration for a signaling radio bearer (SRB) 204a associated with control plane data and a second radio bearer path configuration for a data radio bearer (DRB) 204b associated with user plane data. The procedure 1100 may proceed at 1120 with receiving information indicating one or more measurement configurations for one or more measurement objects associated with the SRB 204a. After 1120, the procedure 1100 may include transmitting measurement data, as control plane data, associated with the one or more measurement objects using the SRB based on (1) the first radio bearer path configuration and (2) the one or more measurement configurations at 1130. At 1140, the WTRU 102 may perform determining to activate the DRB 204b for at least one measurement object of the one or more measurement objects at 1130. For example, the DRB 204b may be activated based on the triggering described herein. At 1150, the WTRU may perform transmitting measurement data, as user plane data, associated with the at least one measurement object of the one or more measurement objects using the DRB based on the second radio bearer path configuration and the one or more measurement configurations.

In certain representative embodiments, the WTRU 102 may implement a procedure similar to the procedure 1100 with respect to multiplexing the transmission of measurement data, as user plane data, using a DRB 204b and an ARB 204c and/or using a SRB 204a and an ARB 204c.

Figure 12:
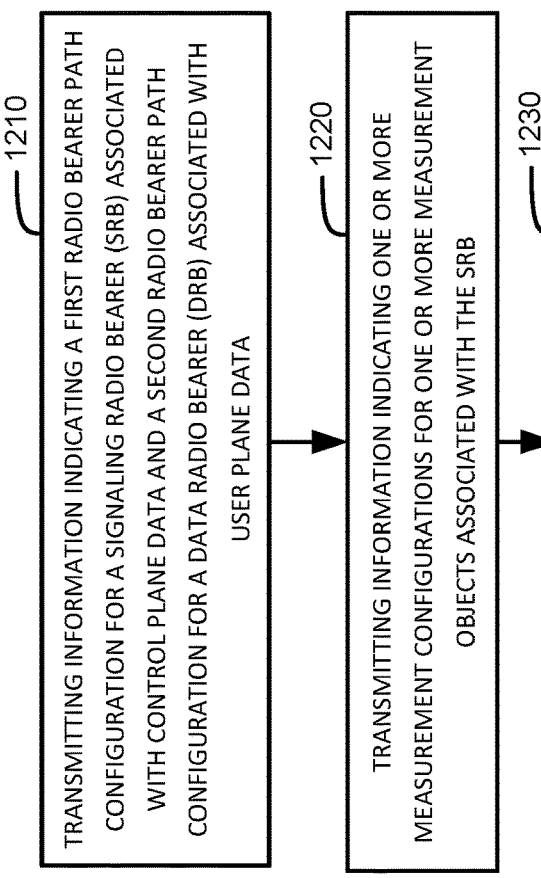
FIG. 12. Is a diagram illustrating a representative procedure which may be implemented by a network for performing radio bearer multiplexing.

FIG. 12. Is a diagram illustrating a representative procedure 1200 which may be implemented by a network entity for performing radio bearer multiplexing. As shown in FIG. 12, the procedure 1200 may begin, at 1210, with transmitting information indicating a first radio bearer path configuration for a signaling radio bearer (SRB) associated with control plane data and a second radio bearer path configuration for a data radio bearer (DRB) 204b associated with user plane data. The procedure 1200 may proceed at 1220 with transmitting information indicating a first radio bearer path configuration for a signaling radio bearer (SRB) 204a associated with control plane data and a second radio bearer path configuration for a data radio bearer (DRB) 204b associated with user plane data. After 1220, the procedure may proceed at 1230 with receiving measurement data, as control plane data, associated with the one or more measurement objects using the SRB 204a. At 1240, the procedure 1200 may proceed at 1240 with receiving measurement data, as user plane data, associated with the at least one measurement object of the one or more measurement objects as user plane data using the DRB 204b.

In certain representative embodiments, the network entity may implement a procedure similar to the procedure 1200 with respect to receiving the transmission of measurement data, as user plane data, using a DRB 204b and an ARB 204c and/or using a SRB 204a and an ARB 204c.

Figure 13:
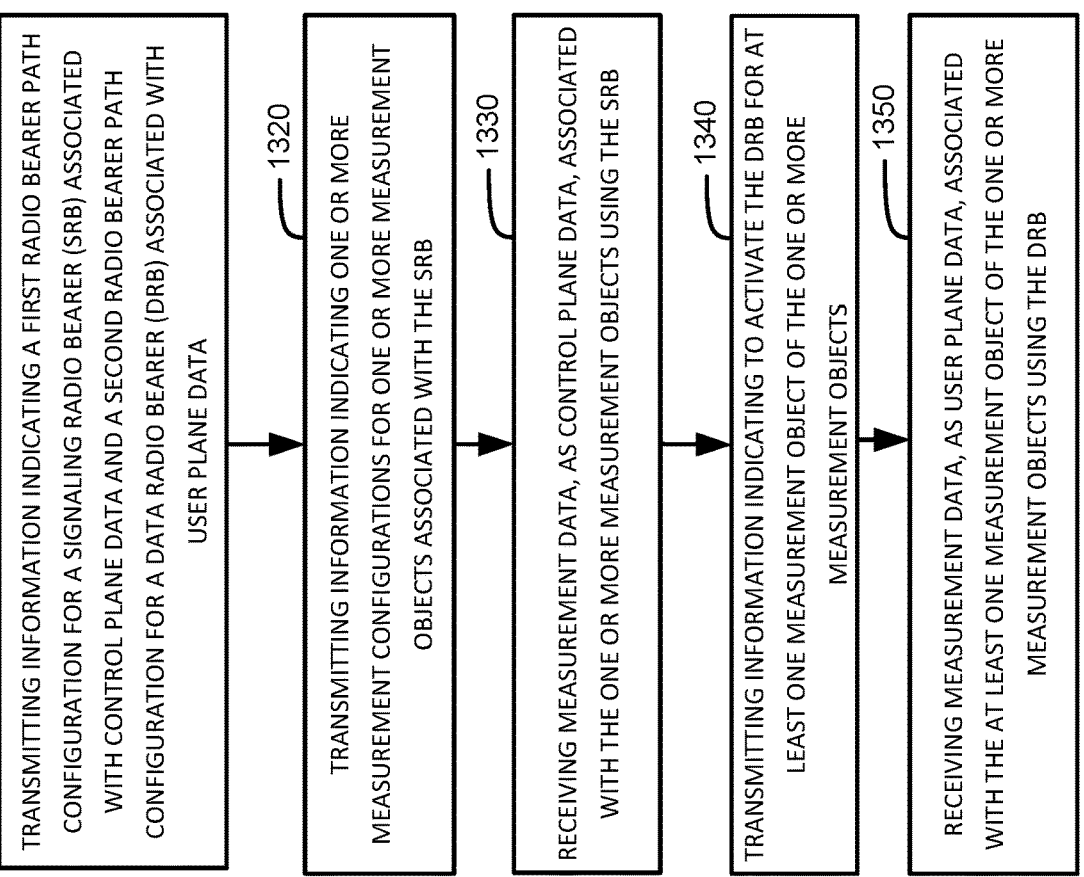
FIG. 13 is a diagram illustrating another representative procedure which may be implemented by a network for performing radio bearer multiplexing.

FIG. 13 is a diagram illustrating another representative procedure which may be implemented by a network entity for performing radio bearer multiplexing. As shown in FIG. 13, the procedure 1300 may begin at 1310 with transmitting information indicating a first radio bearer path configuration for a signaling radio bearer (SRB) 204a associated with control plane data and a second radio bearer path configuration for a data radio bearer (DRB) 204b associated with user plane data. The procedure 1300 may proceed at 1320 with transmitting information indicating one or more measurement configurations for one or more measurement objects associated with the SRB 204a. After 1320, the procedure 1300 may proceed at 1330 with receiving measurement data, as control plane data, associated with the one or more measurement objects using the SRB 204a. At 1340, the procedure 1300 may proceed with transmitting information indicating to activate the DRB 204b for at least one measurement object of the one or more measurement objects. At 1350, the procedure may proceed with receiving measurement data, as user plane data, associated with the at least one measurement object of the one or more measurement objects as user plane data using the DRB 204b.

In certain representative embodiments, the network entity may implement a procedure similar to the procedure 1300 with respect to receiving the transmission of measurement data, as user plane data, using a DRB 204b and an ARB 204c and/or using a SRB 204a and an ARB 204c.

Each of the contents of the following references is incorporated by reference herein: (1) "$3^{rd}$ Generation Partnership Project; Technical Specification Group Radio Access Network; NR; NR and NR-RAN Overall Description; Stage 2 (Release 15)" V15.9.0; (2) "$3^{rd}$ Generation Partnership Project; Technical Specification Group Radio Access Network; NR; NR and NR-RAN Overall Description; Stage 2 (Release 16)" V16.1.0; (3) $3^{rd}$ Generation Partnership Project; Technical Specification Group Radio Access Network; NR; Radio Resource Control (RRC); protocol specification (Release 15)", V15.9.0; (4) $3^{rd}$ Generation Partnership Project; Technical Specification Group Radio Access Network; NR; Radio Resource Control (RRC); protocol specification (Release 16)", V16.0.0; (5) 3rd Generation Partnership Project; Technical Specification Group Services and System Aspects; Telecommunication management; Self-Organizing Networks (SON) Policy Network Resource Model (NRM) Integration Reference Point (IRP); Requirements (Release 9)", V9.0.0; (6) O-RAN Use Cases and Deployment Scenarios Whitepaper, February 2020; (7) "$3^{rd}$ Generation Partnership Project; Technical Specification Group Services and System Aspects; System Architecture for the 5G system (5GS); Stage 2 (Release 16)" V16.4.0; (8) "$3^{rd}$ Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall Description; Stage 2 (Release 16)" V16.0.0; (9) "$3^{rd}$ Generation Partnership Project; Technical Specification Group Radio Access Network; NG-RAN; Xn signaling transport (Release 16)" V16.0.0; (9) "$3^{rd}$ Generation Partnership Project; Technical Specification Group Radio Access Network; NR; NR and NG-RAN; Overall Description; Stage 2 (Release 16)" V16.1.0.

Representative UDIM Use Case

By way of example only, a scenario in which the RAN 104/113 may benefit from multiplexing data transmission and switch the data from the CP to the UP is when a physical event causes one or more sensors or peripherals to generate a large number of measurements or a large volume of measurement data simultaneously, concurrently or within a relatively short time interval. In one embodiment, the WTRU 102 may receive temperature measurements from multiple temperature sensors in a given area. When a power failure, for instance, leads to ceasing air conditioning, a sudden rise in temperature may occur. In response, the temperature sensors may be caused to generate temperature measurements in such volume that transmission via the control plane causes excessive congestion in the control plane. In response, the UDIM 210 may be activated to perform multiplexing to switch transmission of all or part of the generated temperature measurements to the UP/AP via the DRB 204b, the ARB or a combination thereof. Further, the UDIM 210 may be further configured to perform control to prioritize the transmission of the temperature measurements over other WTRU measurement data via a UP QoS framework.

For the above scenario, the RAN 104/113 may first configure the WTRU 102 to collect measurements or measurement data as described herein. In such a configuration, the UDIM 210 may be configured to connect to multiple sensors approximately or near simultaneously or to measurements from such multiple sensors approximately or near simultaneously. An event relevant to the sensors may cause the WTRU 102 to exceed a threshold which may trigger the WTRU 102 to attempt to send the measurement data. Either the WTRU 102 or the RAN 104/113 may determine that the CP is congested, and, in response, the UDIM 210 may be configured to switch a transmission path from the CP to the UP/AP (e.g., for the SRB 204a to the DRB 204b and/or the ARB 204c). The UDIM 210 may then transmit measurement data relating to the multiple sensors through the switched data path. The format used to transmit the measurement data may be specified to the WTRU 102 based on previously specified RRC configuration information. After, the PDU encapsulator 428 may packetize the measurement data into SDAP SDUs and output the SDAP SDUs for transmission via the UP protocol stack. A gNB 180 of the RAN 104/113 may receive the transmitted measurement data from the user plane and the gNB 180 may transmit the received measurement data towards the UPF 184.

In certain representative embodiments, a WTRU may implement a method of multiplexing measurement data communicated from the WTRU. The method may include receiving, by the WTRU, a first message indicating a configuration of a first radio bearer to connect the WTRU 102 and a network entity (NE). The WTRU may perform establishing (e.g., a procedure to configure) the first radio bearer. The WTRU may perform selecting the (e.g., established) first radio bearer to transmit measurement data to the NE. The WTRU may perform transmitting, to the NE, the measurement data via the selected first radio bearer. The measurement data may include one or more of minimization of drive testing (MDT) measurement data and WTRU peripheral sensor measurement data.

In certain representative embodiments, the first radio bearer may be associated with a data path between the WTRU and a central unit (CU) of a user plane of the NE.

In certain representative embodiments, the first radio bearer may be associated with a data path between or among the WTRU and at least one of a radio unit (RU), a distributed unit (DU), or a central unit (CU) of a user plane of the NE.

In certain representative embodiments, the first radio bearer may be associated with a data path between the WTRU and an edge node (e.g., of a edge data network) located after a user plane function (UPF) (e.g., of an access network) along a data path between or among the WTRU and at least one of a radio unit (RU), a distributed unit (DU), or a central unit (CU) of a user plane of the NE.

In certain representative embodiments, the selection of the first radio bearer, by the WTRU, may be performed after receiving a second message indicating a congestion condition with respect to a second radio bearer different than the first radio bearer.

In certain representative embodiments, the first radio bearer may be associated with a control plane, a user plane, an analytics plane or a network analytics slice, and the second radio bearer is associated with a control plane.

In certain representative embodiments, the WTRU may perform the selecting of the first radio bearer after exceeding a transmission threshold (e.g., of measurement data) via the second radio bearer.

In certain representative embodiments, the measurement data transmitted via the selected first radio bearer may include two or more of MDT measurement data, peripheral sensor measurement data associated with at least one peripheral sensor, and at least one protocol stack measurement of a user plane protocol stack at the WTRU.

In certain representative embodiments, the WTRU may perform selecting of the first radio bearer based on a state change of a protocol layer of a protocol stack at the WTRU.

In certain representative embodiments, wherein the first message includes information indicating the configuration of a data radio bearer (DRB) to be selected when the WTRU is in an inactive mode or an idle mode.

In certain representative embodiments, a WTRU may implement a method of changing measurement data communications from a first path associated with a first radio bearer between the WTRU and a NE to a second path between the WTRU and the NE, where the WTRU exchanges the measurement data with the NE via the first radio bearer. The method may include receiving, by the WTRU, a message including information indicating a second radio bearer associated with the second path. The WTRU may perform establishing (e.g., a procedure to configure), the second radio bearer based on the received message. The method may further include determining, by the WTRU, to switch to the second radio bearer. The WTRU may further perform switching from communicating measurement data with the NE using the first radio bearer to communicating measurement data with the NE via the second radio bearer.

In certain representative embodiments, the method may further include sending, by the WTRU, measurement data to the network entity via the second radio bearer, the measurement data including one or more of minimization of drive testing (MDT) measurement data and WTRU peripheral sensor measurement data.

In certain representative embodiments, the first radio bearer may correspond to a control plane of the NE and the second radio bearer may correspond to a user plane of the NE.

In certain representative embodiments, the message may include information further indicating at least one of a radio unit (RU), a distributed unit (DU), or a central unit (CU) of a user plane of the NE as a destination of the measurement data sent via the second radio bearer.

In certain representative embodiments, the WTRU may include a radio resource control (RRC) layer multiplexer which performs the switching (e.g., from communicating measurement data with the NE using the first radio bearer to communicating measurement data with the NE via the second radio bearer).

In certain representative embodiments, the WTRU may include a multiplexer separate from a radio resource control (RRC) layer, and the multiplexer performs the switching (e.g., from communicating measurement data with the NE using the first radio bearer to communicating measurement data with the NE via the second radio bearer).

In certain representative embodiments, the WTRU may perform switching from transmitting measurement data to the NE via the first radio bearer to transmitting the measurement data to the NE via the second radio bearer according to a transition by the WTRU from an inactive mode or idle mode to an active mode.

In certain representative embodiments, the message may include information indicating one or more termination points of the second radio bearer in a protocol stack of the NE.

In certain representative embodiments, the first radio bearer may be a first type (e.g., of radio bearer), and the message may include radio resource control (RRC) information indicating that the second radio bearer is a second or third type (e.g., of radio bearer).

In certain representative embodiments, the RRC information may include a flag indicating the second or third type.

In certain representative embodiments, the WTRU may include a processor, a transmit/receive unit and a storage unit, and may be configured to execute the representative methods described herein.

In certain representative embodiments, the WTRU may be a UAV including a processor, a transmit/receive unit, a storage unit and an aircraft body, and may be configured to execute the representative methods described herein.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a vehicle and/or another mobile device remotely. In the later a case, data may be transferred via wireline or wirelessly between the vehicles or other mobile device.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

What is claimed:

1. A method implemented by a wireless transmit/receive unit (WTRU), the method comprising:
    receiving information indicating a first radio bearer path configuration for a signaling radio bearer (SRB) associated with control plane data and a second radio bearer path configuration for a data radio bearer (DRB) associated with user plane data;
    receiving information indicating one or more measurement configurations for one or more measurement objects associated with the SRB;
    transmitting measurement data, as control plane data, associated with the one or more measurement objects using the SRB based on (1) the first radio bearer path configuration and (2) the one or more measurement configurations;
    determining to activate the DRB for at least one measurement object of the one or more measurement objects based on an amount of the measurement data transmitted using the SRB exceeding a threshold value; and
    after the determining to activate the DRB, transmitting (1) measurement data, as user plane data, associated with the at least one measurement object of the one or more measurement objects using the DRB based on the second radio bearer path configuration and the one or more measurement configurations, and measurement data, as control plane data, associated with the one or more measurement objects other than the at least one measurement object using the SRB based on the first radio bearer path configuration and the one or more measurement configurations.

2. The method of claim 1, wherein the determining to activate the DRB for the at least one measurement object of the one or more measurement objects is based on radio resource control (RRC) signaling.

3. The method of claim 1, wherein the determining to activate the DRB for the at least one measurement object of the one or more measurement objects is based on the receiving of the information indicating the second radio bearer path configuration for the DRB.

4. The method of claim 1, wherein the one or more measurement configurations include one or more measurement data path configurations, and any of the measurement data path configurations include a plurality of destination internet protocol (IP) addresses for the measurement data, as user plane data, using the DRB.

5. The method of claim 1, wherein the measurement data, as user plane data and/or control plane data, is associated with any of one or more sensor measurements from one or more sensors, minimization of drive testing (MDT) data and/or one or more protocol stack measurements associated with a protocol stack of the WTRU.

6. The method of claim 1, further comprising:
    upon condition that the WTRU is not connected to a radio access network (RAN) entity, storing the measurement data.

7. The method of claim 6, further comprising:
    after the WTRU becomes connected to the RAN entity, transmitting the stored measurement data as (1) control plane data for the one or more measurement objects other than the at least one measurement object using the SRB and (2) user plane data for the at least one measurement object using the DRB.

8. The method of claim 1, further comprising:
    aggregating the measurement data based on a configured window prior to the transmitting of the measurement data as control plane data and/or user plane data.

9. The method of claim 1, further comprising:
filtering or transforming the measurement data prior to the transmitting of the measurement data as control plane data and/or user plane data.

10. A wireless transmit/receive unit (WTRU), the WTRU comprising:
a processor, memory, and a transceiver which are configured to:
receive information indicating a first radio bearer path configuration for a signaling radio bearer (SRB) associated with control plane data and a second radio bearer path configuration for a data radio bearer (DRB) associated with user plane data,
receive information indicating one or more measurement configurations for one or more measurement objects associated with the SRB,
transmit measurement data, as control plane data, associated with the one or more measurement objects using the SRB based on (1) the first radio bearer path configuration and (2) the one or more measurement configurations,
determine to activate the DRB for at least one measurement object of the one or more measurement objects based on an amount of the measurement data transmitted using the SRB exceeding a threshold value, and
after determining to activate the DRB, transmit (1) measurement data, as user plane data, associated with the at least one measurement object of the one or more measurement objects using the DRB based on the second radio bearer path configuration and the one or more measurement configurations, and measurement data, as control plane data, associated with the one or more measurement objects other than the at least one measurement object using the SRB based on the first radio bearer path configuration and the one or more measurement configurations.

11. The WTRU of claim 10, wherein the processor, the memory, and the transceiver are configured to determine to activate the DRB for the at least one measurement object of the one or more measurement objects based on radio resource control (RRC) signaling.

12. The WTRU of claim 10, wherein the processor, the memory, and the transceiver are configured to determine to activate the DRB for the at least one measurement object of the one or more measurement objects based on the receiving of the information indicating the second radio bearer path configuration for the DRB.

13. The WTRU of claim 10, wherein the one or more measurement configurations include one or more measurement data path configurations, and at least one of the measurement data path configurations includes a plurality of destination internet protocol (IP) addresses for the measurement data, as user plane data, using the DRB.

14. The WTRU of claim 10, wherein the measurement data, as user plane data and/or control plane data, is associated with any of one or more sensor measurements from one or more sensors, minimization of drive testing (MDT) data and/or one or more protocol stack measurements associated with a protocol stack of the WTRU.

15. The WTRU of claim 10, wherein the processor, the memory, and the transceiver are configured to:
upon condition that the WTRU is not connected to a radio access network (RAN) entity, store the measurement data.

16. The WTRU of claim 15, wherein the processor, the memory, and the transceiver are configured to:
after the WTRU becomes connected to the RAN entity, transmit the stored measurement data as (1) control plane data for the one or more measurement objects other than the at least one measurement object using the SRB and (2) user plane data for the at least one measurement object using the DRB.

17. The WTRU of claim 10, wherein the processor, the memory, and the transceiver are configured to:
aggregate the measurement data based on a configured window associated with the one or more measurement objects prior to the transmitting of the measurement data as control plane data and/or user plane data.

18. The WTRU of claim 10, wherein the processor, the memory, and the transceiver are configured to:
filter or transform the measurement data prior to the transmitting of the measurement data as control plane data and/or user plane data.

* * * * *